(12) United States Patent
Sano

(10) Patent No.: US 7,755,854 B2
(45) Date of Patent: Jul. 13, 2010

(54) IMAGE PICKUP LENS, IMAGE PICKUP APPARATUS AND MOBILE TERMINAL

(75) Inventor: Eigo Sano, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/075,882

(22) Filed: Mar. 14, 2008

(65) Prior Publication Data

US 2008/0239138 A1 Oct. 2, 2008

(30) Foreign Application Priority Data

Mar. 28, 2007 (JP) .............................. 2007-084001

(51) Int. Cl.
   G02B 9/34 (2006.01)
   G02B 3/02 (2006.01)
(52) U.S. Cl. ....................... 359/773; 359/715
(58) Field of Classification Search ......... 359/771–773, 359/708, 715, 766, 739
   See application file for complete search history.

(56) References Cited

U.S. PATENT DOCUMENTS 7,274,518 B1 * 9/2007 Tang et al. .................. 359/772
7,289,278 B1 * 10/2007 Jo et al. ....................... 359/773
2007/0242370 A1 * 10/2007 Fukuta et al. ................ 359/773
2008/0180814 A1 * 7/2008 Kawasaki .................... 359/716

FOREIGN PATENT DOCUMENTS

| JP | 2002-365529 | 12/2002 |
| JP | 2002-365530 | 12/2002 |
| JP | 2002-365531 | 12/2002 |
| JP | 2004-341013 | 12/2004 |
| JP | 2005-292559 | 10/2005 |

* cited by examiner

*Primary Examiner*—Jack Dinh
(74) *Attorney, Agent, or Firm*—Cohen Pontani Lieberman & Pavane LLP

(57) ABSTRACT

An image pickup lens includes, in order from an object side thereof: a aperture stop; a first lens having a positive refractive power; a second lens having a negative refractive power; a third lens having a positive refractive power; and a fourth lens having a negative refractive power and having a biconcave shape including an aspheric surface. The image pickup lens satisfies the predetermined conditions according to focal lengths of the first lens and the third lens.

16 Claims, 27 Drawing Sheets

IMAGE PICKUP LENS, IMAGE PICKUP APPARATUS AND MOBILE TERMINAL

This application is based on Japanese Patent Application No. 2007-084001 filed on Mar. 28, 2007, in Japanese Patent Office, the entire content of which is hereby incorporated by reference.

TECHNICAL FIELD

The present invention relates to a small-sized image pickup lens employing a solid-state image pickup element such as an image sensor of a CCD type or an image sensor of a CMOS type, to an image pickup apparatus having the aforesaid image pickup lens, and to a mobile terminal equipped with the aforesaid image pickup apparatus.

BACKGROUND

In recent years, cell-phones and mobile terminals each being equipped with an image pickup apparatus are in widespread use, which results from higher performance and downsizing of an image pickup apparatus employing a solid-state image pickup element such as a CCD (Charge Coupled Device) type image sensor or a CMOS (Complementary Metal Oxide Semiconductor) type image sensor. Further, for the image pickup lens mounted on these image pickup apparatuses, there are increasing demands for further higher performance and further downsizing. As an image pickup lens for this application, there has been suggested an image pickup lens of a four-element structure type because it has advantages that higher performance can be achieved, compared with a lens of a two-element type or of a three-element type.

As the image pickup lens of the four-element type, Japanese Patent Publication Open to Public Inspection (JP-A) No. 2004-341013 discloses a so-called inverted Ernostar type image pickup lens. The inverted Ernostar type image pickup lens is composed, in the order from the object side, of the first lens having a positive refractive power, the second lens having a negative refractive power, the third lens having a positive refractive power, and the fourth lens having a positive refractive power, to achieve higher performance. Further, each of JP-A Nos. 2002-365529, 2002-365530, 2002-365531, and 2005-292559 discloses an image pickup lens of a so-called telephoto type. The image pickup lens of the telephoto type is composed, in the order from the object side, of the first lens having a positive refractive power, the second lens having a negative refractive power, the third lens having a positive refractive power, and the fourth lens having a negative refractive power, to achieve a smaller size in terms of the total length of the image pickup lens which is a distance on the optical axis from a lens surface closest to the object in the image pickup lens to a focal position at the image side.

However, the image pickup lens described in JP-A No. 2004-341013 has a positive fourth lens due to the inverted Ernostar type and the image pickup lens provides a principal point position of the optical system closer to the image side and a longer back focus, compared with an image pickup lens of telephoto type which provides a negative fourth lens. Therefore, such type of image pickup lens as described in JP-A No. 2004-341013 is disadvantageous for downsizing. In addition, there is provided only one lens having negative refractive power among four lenses in the image pickup lens. Thus, it provides a difficulty in correction of Petzval's sum, and in securing excellent performance on the periphery portion of the image area.

The image pickup lens described in each of JP-A Nos. 2002-365529, 2002-365530, and 2002-365531 has a narrower imaging field angle and insufficiently corrects its aberrations. If the total length of the image pickup lens is further shortened, it becomes difficult to be used with an image pickup element with a large number of pixels due to deterioration of its performance.

Further, the image pickup lens described in JP-A No. 2005-292559 has the fourth lens in a meniscus shape whose convex surface faces the object. Due to this, a peripheral portion of the fourth lens is protruded toward the image. In order to prevent the fourth lens from interfering with a parallel plate such as an optical low-pass filter, infrared-ray cut filter, and a seal glass of a package of the solid-state image pickup element which are arranged between the fourth lens and the solid-state image pickup element, and a substrate of the solid-state image pickup element, it requires securing a long back focal length. The image pickup lens described in JP-A No. 2005-292559 actually has a long back focal length in spite of telephoto-type, and does not sufficiently achieve its downsizing. Additionally, the image pickup lens insufficiently corrects aberrations to be used with an image pickup element with a large number of pixels.

SUMMARY

In view of the aforesaid problems, the present invention provides an image pickup lens of a four-element structure in which various aberrations can be corrected properly in spite of the size that is smaller than that of a conventional lens, and provides the image pickup lens and a mobile terminal equipped with the image pickup apparatus.

An image pickup lens relating to the present invention is an image pickup lens for forming an image of an object on a photoelectrical converter of a solid-state image pickup element. The image pickup lens includes, in order from an object side thereof: an aperture stop; a first lens having a positive refractive power; a second lens having a negative refractive power; a third lens having a positive refractive power; and a fourth lens having a negative refractive power and a biconcave shape and comprising a surface in an aspheric shape. The image pickup lens satisfies the predetermined conditions according to focal lengths of the first lens and the third lens.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Figure 1:
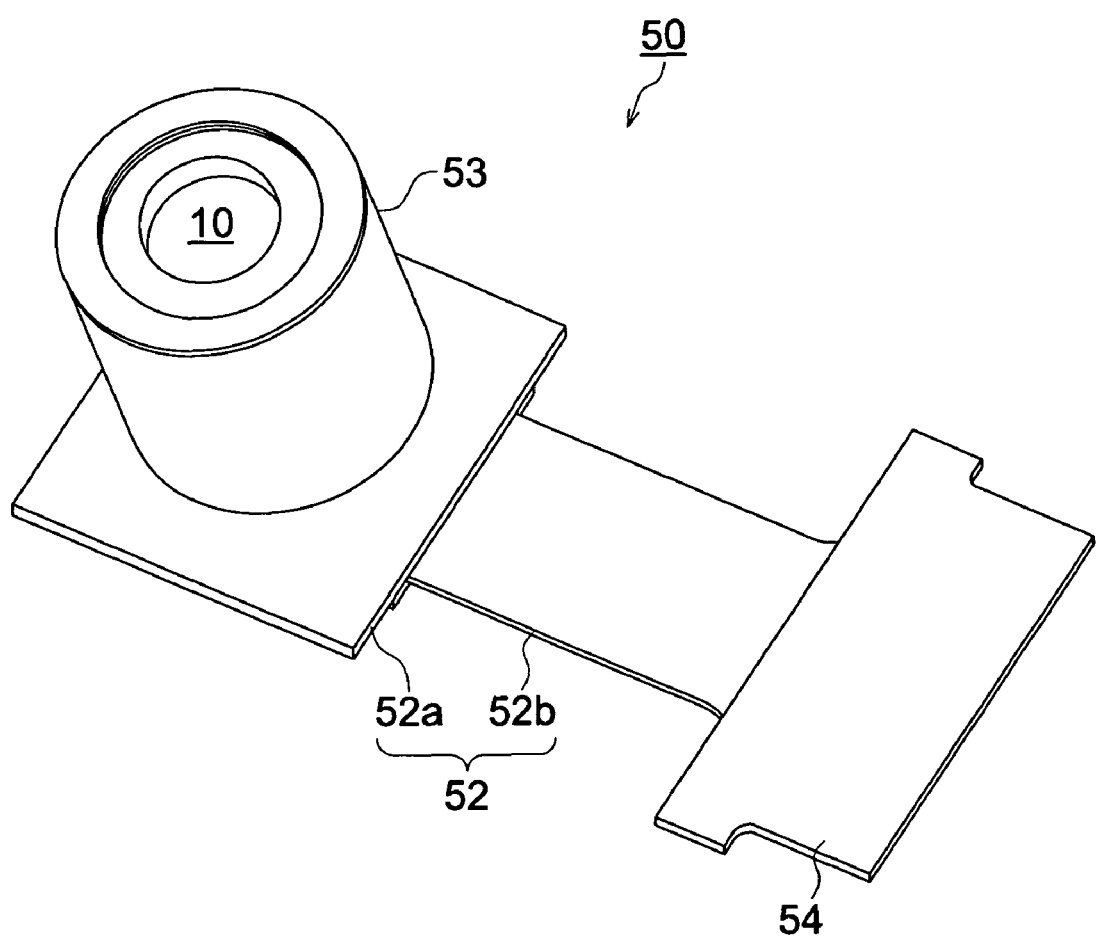
FIG. 1 is a perspective view of an image pickup apparatus relating to the present embodiment.

Preferable embodiments of the invention will be explained as follows.

An embodiment relating to the present invention is an image pickup lens for forming an image of an object on a photoelectrical converter of a solid-state image pickup element. The image pickup lens comprises, in order from an object side thereof: an aperture stop; a first lens having a positive refractive power; a second lens having a negative refractive power; a third lens having a positive refractive power; and a fourth lens having a negative refractive power and a biconcave shape and comprising a surface in an aspheric shape. The image pickup lens satisfies the following expressions.

$$0.30 < f1/f < 0.85 \quad (1)$$

$$0.30 < f3/f < 1.00 \quad (2)$$

In these expressions, f1 is a focal length of the first lens, f3 is a focal length of the third lens, and f is a focal length of the total system of the image pickup lens.

A basic structure of the embodiment for acquiring a small-sized image pickup lens wherein aberration is properly corrected is composed of, in order from an object side, an aperture stop; a first lens having a positive refractive power, a second lens having a negative refractive power, a third lens having a positive refractive power, and a fourth lens having a negative refractive power and a biconcave shape. This lens structure is the so-called telephoto type structure wherein a positive lens group composed of the first lens, the second lens and the third lens and a negative fourth biconcave lens are arranged in the order from the object side, which is advantageous for downsizing of the total length of an image pickup lens. Further, by forming the fourth lens arranged to be closest to the image side into a biconcave shape, a peripheral part of the fourth lens does not thrust out greatly toward the image plane, and a back focus can be shortened while avoiding contact with a parallel flat plate such as an optical low-pass filter, an infrared-ray cut filter, and a seal glass of a solid-state image pickup element package which are arranged between the fourth lens and a solid-state image pickup element, and a substrate of a solid-state image pickup element, resulting in the structure that is advantageous for shortening the total length of the image pickup lens.

Further, providing two negative lenses in four-element structure lens increases the number of surfaces having light-diverging actions, thereby, Petzval's sum is corrected easily. It can provide an image pickup lens wherein image forming capability that produces excellent images is secured up to peripheral portions of an image area. Further, by providing at least one aspheric surface of the fourth lens which is arranged to be closest to the object side, it is possible to correct various aberrations on the peripheral portions on the image area.

In addition, by arranging an aperture stop to be closest to the object side, it is possible to arrange a position of an exit pupil to be farther from an image pickup plane, and thereby to control an incident angle of principal ray (an angle between a principal ray and an optical axis) of a light flux that forms an image on a peripheral portion of an image pickup plane of a solid-state image pickup element to be small, thus, the so-called telecentricity can be secured. Further, even in the case where a mechanical shutter is needed, it can be arranged to be closest to the object side, and it can provide an image pickup lens whose total length is short.

The conditional expression (1) is provided for setting a focal length of the first lens to be appropriate, for shortening the total length of an image pickup lens and for attaining correction of aberrations properly.

When a value of the conditional expression (1) is lower than the upper limit thereof, refractive power of the first lens can be maintained properly, a composite principal of the first through third lenses can be positioned to be closer to the object side and the total length of the image pickup lens can be shortened. On the other hand, when a value of the conditional expression (1) is higher than the lower limit thereof, refractive power of the first lens does not grow greater beyond necessity, and spherical aberration of a high order and coma both generated on the first lens can be controlled to be small. In addition, the following conditional expression is more preferable.

$$0.45 < f1/f < 0.82 \quad (1')$$

Further, the following conditional expression is further more preferable.

$$0.50 < f1/f < 0.75 \quad (1'')$$

The conditional expression (2) is provided for setting a focal length of the third lens to be appropriate.

When a value of the conditional expression (2) is lower than the upper limit thereof, refractive power of the third lens can be maintained properly, thereby, a position of an exit pupil can be arranged to be farther from an image pickup plane, and an incident angle of principal ray (an angle between a principal ray and an optical axis) of a light flux that forms an image on a peripheral portion of an image pickup plane of a solid-state image pickup element can be controlled to be small, thus, the so-called telecentricity can be secured, resulting in control of a phenomenon of substantial reduction of aperture efficiency which is shading. On the other hand, when a value of the conditional expression (2) is higher than the lower limit thereof, refractive power of the third lens does not grow greater beyond necessity, and a principal point of the optical system can be arranged at the object side, whereby, the total length of the lens can be shortened. In addition, the following conditional expression is more preferable.

$$0.35 < f3/f < 0.95 \quad (2')$$

Further, the following conditional expression is further more preferable.

$$0.40 < f3/f < 0.80 \quad (2'')$$

In the above embodiment, the image pickup lens preferably satisfies the following expression.

$$-4.00 < \text{Pair}/P < -0.80 \quad (3)$$

In this expression, P is a refractive power of a total system of the image pickup lens, and Pair is a refractive power of an air lens formed from a surface of the second lens facing an image side and a surface of the third lens facing the object side, where a refractive power is represented by a reciprocal of a focal length. Pair is defined by the following expression.

$$\text{Pair} = \frac{1-n2}{r4} + \frac{n3-1}{r5} - \frac{(1-n2)(n3-1) \times d23}{r4 \times r5} \quad (4)$$

In the expression, n2 is a refractive index of the second lens for d line, n3 is a refractive index of the third lens for d line, r4 is a curvature radius of the surface of the second lens facing the image side, r5 is a curvature radius of the surface of the third lens facing the object side, and d23 is a length of an air space between the second lens and the third lens along an optical axis of the image pickup lens.

The conditional expression (3) is provided for setting refractive power of a air lens formed by a surface of the second lens on the image side and by a surface of the third lens on the object side to be appropriate.

When a value of the conditional expression (3) is lower than the upper limit thereof, negative refractive power of the air lens can be maintained properly, and a Petzval's sum does not grow to be too great, an image plane can be made flat and chromatic aberration can be corrected favorably. On the other hand, when a value of the conditional expression (3) is higher than the lower limit thereof, negative refractive power of the air lens does not become too strong, whereby, a radius of curvature of the surface of the second lens on the image side and that of the surface of the third lens on the object side can be made large, resulting in excellent workability for lenses. Further, since the surface of the second lens on the image side that of the surface of the third lens on the object side departs from the surface of the third lens on the object side on an off-axis portion, a space for inserting a light shielding member for preventing unwanted light such as a ghost between the second lens and the third lens can be secured easily. Further the following conditional expression is more preferable.

$$-3.50 < \text{Pair}/P < -0.90 \quad (3')$$

In the above embodiment, the image pickup lens preferably satisfies the following expression.

$$-0.90 < f4/f < -0.20 \quad (5)$$

In this expression, f4 is a focal length of the fourth lens and f is a focal length of the total system of the image pickup lens.

The conditional expression (5) is provided for setting a focal length of the aforesaid fourth lens to be appropriate.

When a value of the conditional expression (5) is lower than the upper limit thereof, negative refractive power of the fourth lens does not grow greater beyond necessity, and a light flux that forms an image on a peripheral portion of an image pickup plane of a solid-state image pickup element is not lifted up excessively, thus, telecentricity of a light flux on the image side can be secured easily. On the other hand, when a value of the conditional expression (5) is higher than the lower limit thereof, negative refractive power of the fourth lens can be maintained to be appropriate, and it is possible to conduct properly the shortening of the total length of the lens and correction of various aberration on off-axis portion such as a curve of image surface and distortion aberration. Further, the following conditional expression is more preferable.

$$-0.80 < f4/f < -0.30 \quad (5')$$

In the above embodiment, the image pickup lens preferably satisfies the following expression.

$$0 < (r7+r8)/(r7-r8) < 1.0 \quad (6)$$

In this expression, r7 is a curvature radius of a surface of the fourth lens facing the object side, and r8 is a curvature radius of a surface of the fourth lens facing an image side.

The conditional expression (6) is provided for setting a focal length of the fourth lens to be appropriate.

In the range shown in the conditional expression (6), the fourth lens changes from the biconcave shape wherein refractive power on the image side is greater than that on the object side to the plano-concave shape. When a value of the conditional expression (6) is lower than the upper limit thereof, the peripheral portion of the fourth lens does not thrust out greatly toward the image side, and it is possible to avoid contact with a parallel flat plate such as an optical low-pass filter, an infrared-ray cut filter, and a seal glass of a solid-state image pickup element package which are arranged between the fourth lens and a solid-state image pickup element, and a substrate of a solid-state image pickup element. On the other hand, when a value of the conditional expression (6) is higher than the lower limit thereof, a principal point of the fourth lens does not move excessively to the image side, and a height of a ray of light on the optical axis passing through the fourth lens can be maintained properly, which is advantage to the correction of on-axis chromatic aberration. Further, the following conditional expression is more preferable.

$$0.10 < (r7+r8)/(r7-r8) < 0.95 \quad (6')$$

In the above embodiment, a surface of the second lens facing an image side preferably has an aspheric shape such that a negative refractive power at a position on the surface of the second lens becomes smaller as the position moves from a center to a periphery of the surface of the second lens.

By forming a surface of the second lens on the image side to be in an aspheric surface form such that negative refractive power becomes weaker toward a peripheral portion from the center, a ray of light is not lifted excessively on the peripheral portion, and excellent telecentricity on the peripheral portion can be secured.

In the above embodiment, a surface of the third lens facing an image side also preferably has an aspheric shape such that a positive refractive power at a position on the surface of the third lens becomes smaller as the position moves from a center to a periphery of the surface of the third lens.

By forming a surface of the third lens on the image side to be in an aspheric surface shape such that positive refractive power becomes weaker toward a peripheral portion from an optical axis, an angle formed by an incident light beam and an outgoing light beam, namely, the so-called angle of deviation can be kept to be small, and an longitudinal aberration of a light flux that forms an image on a peripheral portion of an image pickup plane of a solid-state image pickup element can be controlled to be small.

In the above embodiment, a surface of the fourth lens facing an image side also preferably has an aspheric shape such that a negative refractive power at a position on the surface of the fourth lens becomes smaller as the position moves from a center to a periphery of the surface of the fourth lens, and the surface of the fourth lens facing an image side preferably has an inclination point.

When a surface of the fourth lens on the image side is formed in an aspheric surface shape having therein an inflection point wherein negative refractive power becomes weaker toward a peripheral portion from an optical axis, telecentricity of a light flux on the image side become easy to be secured. Further, since it is not necessary to cause negative refractive power to be weak excessively on a peripheral portion of the lens, it becomes possible to correct longitudinal aberration favorably.

In this case, "the inflection point" means a point on an aspheric surface at which a tangential plane on the vertex of the aspheric surface becomes perpendicular to the optical axis on the curve of the lens sectional form within an effective radius.

Further, "effective radius" mentioned in the present specification means the maximum value of heights from an optical axis of the points on each lens surface at which marginal rays of all light fluxes forming an image within an image pickup plane of a solid-state image pickup element passes through.

In the above embodiment, the surface of the fourth lens facing the image side preferably satisfies the following expression.

$$0.40 < PH8/H < 0.80 \quad (7)$$

In this expression, PH8 is a height of an inflection point of the surface of the fourth lens facing the image side from an optical axis, and H is an effective radius of the surface of the fourth lens facing the image side.

The conditional expression (7) is provided for setting a ratio the height of the inflection point from the optical axis to the effective radius, on the surface of the fourth lens on the image side.

When a value of the conditional expression (7) is lower than the upper limit thereof, an inflection point, namely, a height of the image side surface of the fourth lens where the surface thrusts out mostly toward the image side does not grow to be too large, and contact with members arranged on the peripheral portions of the lens can be avoided. On the other hand, when a value of the conditional expression (7) is higher than the lower limit thereof, telecentricity at the peripheral portions can easily be secured because an inflection point is set to the position that is away appropriately from an optical axis, and a curvature of field on the peripheral portion can be corrected properly. Further, the following conditional expression is more preferable.

$$0.43 < PH8/H < 0.75 \quad (7')$$

In the above embodiment, the image pickup lens preferably satisfies the following expression.

$$15 < v1-v2 < 65 \quad (8)$$

In this expression, v1 is an Abbe number of the first lens, and v2 is an Abbe number of the second lens.

The conditional expression (8) is provided for correcting chromatic aberration of the total system of the image pickup lens properly.

When a value of the conditional expression (8) is higher than the lower limit thereof, longitudinal chromatic aberration and magnification chromatic aberration can be corrected in a balanced manner. On the other hand, when a value of the conditional expression (8) is lower than the upper limit thereof, it is possible to construct with glass materials with greater availability. Further, the following conditional expression is more preferable.

$$20 < v1-v2 < 65 \quad (8')$$

In the above embodiment, the image pickup lens preferably satisfies the following expression.

$$1.60 < n2 < 2.10 \quad (9)$$

In this expression, n2 is a refractive index of the second lens for d line.

The conditional expression (9) is provided for correcting chromatic aberration of the total system of the image pickup lens and a curvature of field properly.

When the value of the conditional expression (9) is higher than the lower limit thereof, refractive power of the second lens whose dispersion is relatively great can be maintained properly, and chromatic aberration and a curvature of field can be corrected properly. On the other hand, when the conditional expression (9) is lower than the upper limit thereof, it is possible to construct with glass materials with greater availability. Further, the following conditional expression is more preferable.

$$1.60 < n2 < 2.00 \quad (9')$$

In the above embodiment, each of the first to fourth lenses may be formed of a plastic material.

In recent years, with the purpose of downsizing the whole of a solid-state image pickup element, there has been developed a solid-state image pickup element having a smaller pixel pitch compared with a solid-state image pickup element having the same number of pixels, and having a smaller size of an image pickup plane as the result. A solid-state image pickup element having the small-sized image pickup plane of this kind requires a relatively short focal length as the total system. It makes a radius of curvature and an outside diameter of each lens small. Therefore, lenses can be mass produced at low cost in spite of their small radius and their small outside diameter by constituting all lenses with plastic lenses manufactured by injection molding, in comparison with a glass lens manufactured through time-consuming processing of grinding. Further, since pressing temperature of the plastic lens can be low, it is possible to control wear of a molding die, and thereby to reduce the number of molding dies to be replaced and the number of maintenances, resulting in cost reduction.

In the above embodiment, one of the first lens and the third lens may be formed of a glass material, and each of the first to fourth lenses excluding the one of the first lens and the third lens may be formed of a plastic material.

When either one of the first lens and the third lens each having positive refractive power is made of glass material that hardly has changes of refractive index for temperature changes, and if other lenses are made of plastic materials, it is possible to compensate for fluctuations of image point position of the total system of image pickup lens in the case of temperature changes, while using many plastic lenses. More concretely, positive refractive power that is relatively great is assigned to the positive first lens or to the positive third lens that is made of plastic material, and negative refractive power is assigned to each of two negative lenses including the second lens and the fourth lens. That structure can optimize distribution of refractive power for plastic lenses. Thus, the refractive powers affect fluctuations of image point position in the case of temperature changes in the direction to cancel each other, and it is possible to control fluctuations of image point position due to temperature change as the total system of image pickup lens to be small.

Further, when the first lens is made of glass material, the image pickup lens can be constituted without exposing plastic lenses to the outside, whereby, the problem of scratches on the first lens can be avoided, resulting in a more preferable constitution.

Meanwhile, an expression of "made of plastic material" or "formed of plastic material" includes an occasion wherein plastic materials are used as a base material, and a surface thereof is subjected to coating processing for the purpose of preventing reflection and of improving surface hardness. The aforesaid expression also includes an occasion wherein inorganic microparticles are mixed in the plastic materials for the purpose of controlling changes of refractive index of plastic material due to temperature change to be small.

In the above embodiment, each of the first to fourth lenses may be formed of a glass material.

When all lenses are made of glass materials, the glass materials having higher refractive index and lower dispersion can be selected for the lenses, compared with plastics, and it is possible to control chromatic aberration to be small while keeping a focal length of the total lens system to be short. It is further possible to make fluctuations of image point position of the total system of an image pickup lens in the case of temperature changes to be substantially zero, by forming a lens with glass materials that hardly have changes of refractive index in the case of temperature changes. When the first lens is made of glass materials, it is possible to prevent problems of scratches on the first lens and others, because the image pickup lens can be constituted without plastic lenses being exposed to the outside.

Further, a unit of a camera module having sufficient heat resistance is demanded to resist a reflow process, because work efficiency for mounting the camera module unit can be enhanced, when the camera module unit is soldered to be mounted on another circuit base board by automatic mounting employing a reflow process. The glass material has sufficient heat resistance property which stands up to the reflow process and lenses formed of the glass material has an effect to be used also for a camera module for which a reflow process is use.

Meanwhile, an expression of "made of glass material" or "formed of glass material" includes an occasion wherein glass materials are used as a base material, and a surface thereof is subjected to coating processing for the purpose of preventing reflection and of improving surface hardness.

In the above embodiment, each of the first and second lenses may be formed of a glass material, and each of the third and fourth lenses may be formed of a plastic material.

When the first lens and the second lens each having relatively strong refractive power are made of glass material, it is possible to control a cost of the whole of the image pickup lens to be small. At the same time, fluctuations of image point position of the total system of the image pickup lens can be small, by using a plastic lens for each of the third lens and the fourth lens. When the first lens is made of glass materials, it is possible to prevent problems of scratches on the first lens and others, because the image pickup lens can be constituted without plastic lenses being exposed to the outside.

Another embodiment relating to the present invention is an image pickup apparatus comprising: a base board supporting the solid image pickup element; and a connecting terminal formed on the base board for transmitting and receiving electrical signal. The image pickup apparatus further comprises: a casing formed of a shielding material, and comprising an opening where a light flux from an object side enters into; and the image pickup lens of the above embodiment housed in the casing, for receiving a light flux passing through the opening and forming the light flux onto the solid image pickup element. The casing, the image pickup lens, and the base board are assembled as one body. The image pickup apparatus has a height of 10 mm or less along the optical axis.

It is possible to obtain a smaller-sized and higher-performance image pickup apparatus, by using the image pickup lens.

An expression of "opening where a light flux from an object side enters into" means a portion forming an area capable of transmitting the incident light flux coming from the object side, without being limited to an empty space such as a hole.

Further, an expression of "an image pickup apparatus has a height of 10 mm or less along the optical axis" means the total length in the optical axis direction for the image pickup apparatus equipped with all of the aforesaid elements. Therefore, for example, when a casing is provided on a surface of the base board, and electronic parts are mounted on the back of the base board, it is estimated that a distance from the tip portion of the casing on the object side to the tip portion of the electronic parts protruding on the rear surface is 10 mm or less.

Another embodiment relating to the present invention is a mobile terminal comprising the image pickup apparatus of the above embodiment.

Herein, a measure of a small-sized image pickup lens is described. Embodiments are provided with aimed at downsizing at the level to satisfy the following expression (10). By satisfying the following range, the total length of the image pickup lens can be shortened, and an outside diameter of the lens can also be made smaller synergistically. Owing to this, it is possible to attain downsizing and weight reduction of the total image pickup apparatus.

$$L/f<1.40 \tag{10}$$

In the expression, L represents a distance from a lens surface closest to the object side in the total system of image pickup lens to the focus on the image side, and f represents a focal length of the total system of an image pickup lens.

Herein, the focus on the image side means an image point formed when parallel light that is in parallel with an optical axis enters the image pickup lens. Meanwhile, when a parallel flat plate such as an optical low-pass filter, an infrared-ray cut filter and a seal glass of an image pickup element is arranged between the surface closest to the image side in the image pickup lens and the focus position on the image side, a value of the aforesaid L is to be calculated under the condition that a parallel flat plate portion is made to be an air-conversion distance.

Further, the structure more preferably satisfies the following conditional expression.

$$L/f<1.30 \tag{10'}$$

Preferred embodiments will be described below with referring drawings. However, such description is for illustrative purposes only, and it is to be understood that changes and variations may be made without departing from the spirit or scope of the appended claims.

Figure 2:
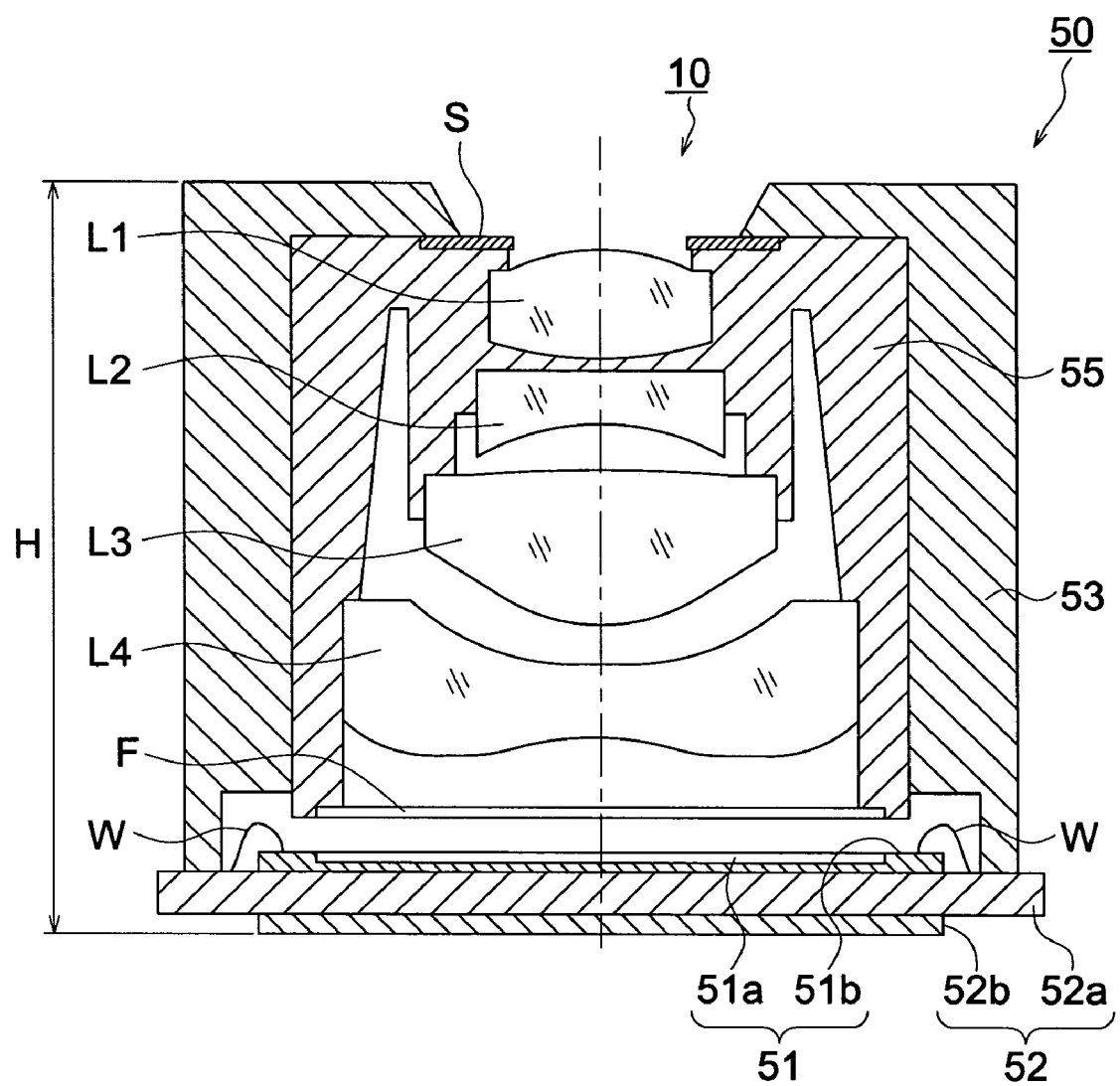
FIG. 2 is a diagram schematically showing a cross section that is in parallel with an optical axis of an image pickup lens of an image pickup apparatus relating to the present embodiment.

FIG. 1 is a perspective view of an image pickup apparatus according to the present embodiments. FIG. 2 is a view typically showing the section along the optical axis of the image pickup lens of the image pickup apparatus according to the present embodiments.

As shown in FIG. 1 and FIG. 2, the image pickup apparatus 50 is provided with: a CMOS type image pickup element 51; the image pickup lens 10; a casing 53; supporting base board 52a; and a flexible print base board 52b. They are assembled in one body. The CMOS type image pickup element 51 is provided as the solid-state image pickup element and includes the photoelectric converter 51a. The image pickup lens 10 is provided for taking the object image to the photoelectric converter 51a of this image pickup element 51. The casing 53 is provided as a lens frame formed of the light-shielding member and includes an opening section for the incident light from the object side of the image pickup lens. The supporting base board 52a supports the image pickup element 51. The flexible print base board 52b includes the terminal for the external connection 54 which is called also the external connecting terminal and which sends and receives the electric signal.

As shown in FIG. 2, the image pickup element 51 includes the photoelectric converter 51a as the light receiving section in which pixels (photoelectric conversion element) are 2-dimensionally arranged at the central part of the surface on the light receiving side. On the periphery of the photoelectric converter 51a, the signal processing circuit 51b is formed. This signal processing circuit 51b is structured by: the drive circuit section which successively drives each pixel and obtains the signal charge; the A/D conversion section which converts each signal charge into the digital signal; and the signal processing section which forms the image signal output by using this digital signal.

In the vicinity of the outer edge of the surface on the light receiving side of the image pickup element 51, many pads are provided, and connected to the support base board 52a through the bonding wire W. Hereupon, the image pickup element is not limited to the above-described CMOS type image sensor, but the other element such as CCD may be applied to the image pickup element.

The base board 52 is structured by a hard support base board 52a and a flexible print base board 52b. The hard support base board supports the image pickup element 51 and the casing 53 by its one surface. One end of the flexible print base board 52b is connected to the other surface (the surface opposed to the image pickup element 51) of the support base board 52a. On the support base board 52a, many signal transmission pads are provided on the both surfaces of the front and rear surfaces. On the one surface, it is connected to the image pickup element 51 through a bonding wire W, and on the other surface, it is connected to the flexible print base board 52b.

In the flexible print base board 52b, as shown in FIG. 1, one end part is connected to the support base board 52a. It allows that the support base board 52a and an external circuit (for example, a control circuit provided by the higher level of apparatus in which the image pickup apparatus is installed) are connected through the external connecting terminal 54 provided on the other end part. It also allows that the voltage for driving the image pickup element 51 or the clock signal from the external circuit is supplied to the flexible print base board 52b and that outputs the digital YUV signal is outputted to the external circuit. Furthermore, the flexible print base board 52 has the flexibility. Thereby, the intermediate part of the flexible print base board 52 is deformed, and it gives the support base board 52a the degree of its freedom to the orientation or the arrangement of the external connecting terminal 54.

As shown in FIG. 2, the casing 53 is fixedly arranged on a surface of the support base board 52a which is a surface facing the image pickup element 51 so as to cover the image pickup element 51. That is, one side of the casing 53 facing the image pickup element 51 has a widely opened shape so as to surround the image pickup element 51 and is contacted and fixed to the support base board 52a. The other side of the casing 53 is formed in a cylindrical shape having a flange with a small opening.

Inside of the casing 53, an infrared-ray cut filter F is fixedly arranged between the image pickup lens 10 and the image pickup element 51.

Image pickup lens 10 is composed of aperture stop S, first lens L1, second lens L2, third lens L3, and fourth lens L4 and it is structured so that an object image may be formed on photoelectric conversion surface 51a of image pickup element 51.

Each one-dot chain line in FIG. 2 represents an optical axis for each of the lens L1-lens L4.

Respective lenses L1-L4 constituting image pickup lens 10 are held on lens frame 55. Casing 53 houses therein the lens frame 55 and image pickup lens 10 held by the lens frame 55, and the lens frame 55 fits in the casing 53 through an outer circumference of the lens frame 55 to hit a flange portion having small openings of the casing 53 to be positioned.

Incidentally, when connecting image pickup apparatus 50 to another circuit base board, terminal for connecting with an outside (which is also called outside connection terminal) 54 and flexible print base board 52b are not needed. Further, casing 53 and lens frame 55 are made of materials having heat resistance that resists against reflow process.

In the image pickup apparatus shown in FIG. 2, a height of the image pickup apparatus in the direction of the optical axis of the image pickup lens is represented by illustrated H.

It is further possible to arrange a fixed diaphragm that blocks unwanted light between respective lenses L1-L4. In particular, it is preferable to arrange the fixed diaphragm between the third lens and optical filter F. It is further possible to arrange a rectangular fixed diaphragm outside an optical path because it can control generation of ghost and flare.

Figure 3:
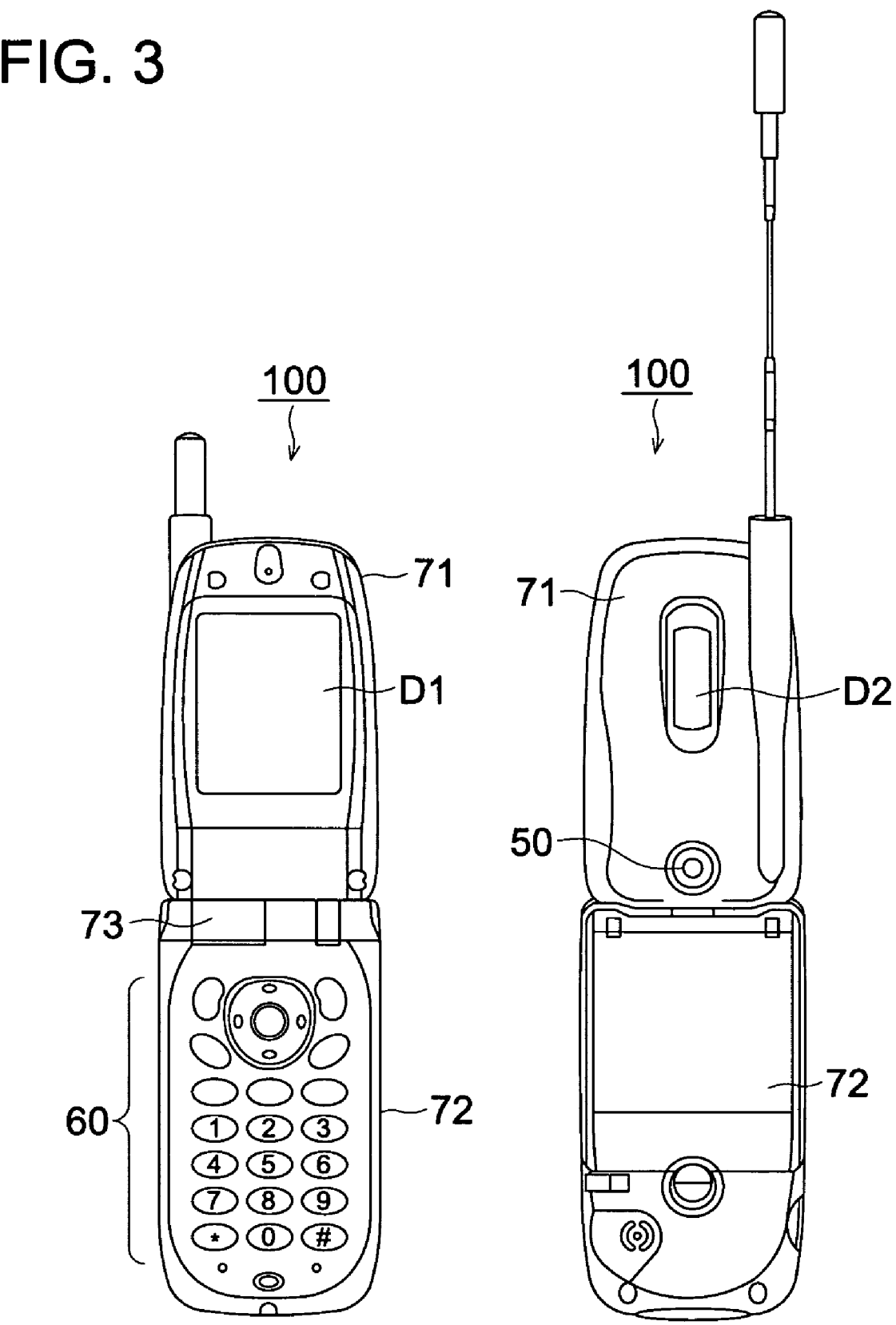
FIG. 3 is an outline drawing of a mobile-phone representing an example of a mobile terminal equipped with an image pickup apparatus relating to the present embodiment.

FIG. 3 is an appearance view of a mobile phone 100 which is an example of a mobile terminal provided with the image pickup apparatus 50 of the present embodiment.

In the mobile phone 100 shown in FIG. 3, an upper casing 71 as a case provided with the display image screens D1 and D2, and the lower casing 72 provided with operation buttons 60 which is an input section, are connected with each other through a hinge 73. The image pickup apparatus 50 is housed below the display image screen D2 in the upper casing 71, and the image pickup apparatus 50 is arranged in such a manner that the light can be taken-in from the outer surface side of the upper casing 71.

Hereupon, this image pickup apparatus may also be arranged above the display image screen D2 or on the side surface of the display image screen D2, in the upper casing 71. Further, it is of cause that the mobile phone is not limited to a folding type.

Figure 4:
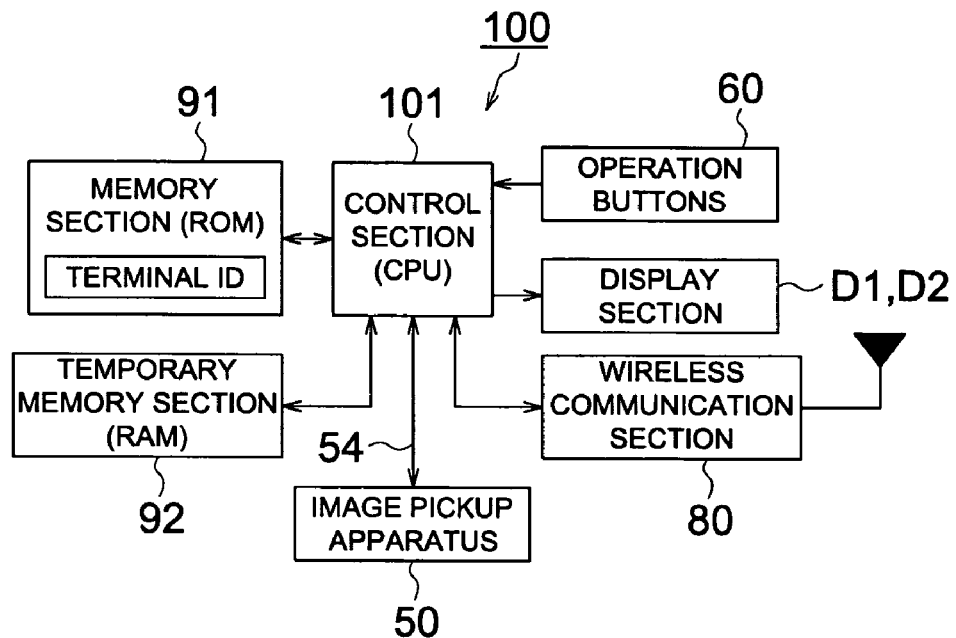
FIG. 4 is a control block diagram of a mobile-phone.

FIG. 4 is a block diagram of the mobile phone 100.

As shown in FIG. 4, the external connecting terminal 54 of the image pickup apparatus 50 is connected to the control section 101 of the mobile phone 100, and the image signal such as the brightness signal or the color difference signal is outputted to the control section 101.

On the one hand, the mobile phone 100 is provided with: a control section (CPU) 101 which generally controls each section and executes the program corresponding to each processing, operation buttons 60 which is an input section for indicating-inputting the number, the display image screen D1 and D2 for displaying the predetermined data display or image picked-up image, a wireless communication section 80 for realizing an each kind of information communication to the external server, a memory section (ROM) 91 which stores the data necessary for the system program of the mobile phone 100 or each kind of processing program or terminal ID, and a temporary memory section (RAM) 92 which temporarily stores each kind of processing program or data or processing data processed by the control section 101, the image data by the image pickup apparatus 50, or is used as a working area.

Further, the image signal inputted from the image pickup apparatus 50 is stored in the memory section 91 by the control section 101 of the mobile phone 100, is displayed on the display image planes D1 or D2, and further is transmitted to the outside as the image information through the wireless communication section 80.

EXAMPLES

Examples of the image pickup lens applied to the above embodiment will be shown below. Symbols used in each example are as follows:

f: Focal length of total system of image pickup lens
fB: Back focus
F: F-number
ω: Maximum half field-angle
2Y: Diagonal length of image pickup plane of solid-state image pickup element
ENTP: Entrance pupil position (Distance from the first surface to entrance pupil position)
EXTP: Emergence pupil position (Distance from image pickup plane to the emergence pupil position)
H1: Front side principal point position (Distance from the first surface to front side principal point position)
H2: Rear side principal point position (Distance from the last surface to rear side principal point position)
R: Radius of curvature
D: On-axis surface interval
Nd: Refractive index of lens material for d line
vd: Abbe's number of lens material In each Example, the asterisk (*) following each surface number means an aspheric surface and the shape of the aspheric surface is expressed by the following expression (11) in which the top of the surface is on the origin, x-axis extends along the optical axis direction, and the height perpendicular to the optical axis is h.

$$X = \frac{h^2/R}{1+\sqrt{1-(1+K)h^2/R^2}} + \sum A_i h^i \quad (11)$$

In the expression (11), $A_i$ is i-th order of aspheric surface coefficient,
R is a curvature radius, and
K is a conical coefficient.

Example 1

Lens data of image pickup lens in Example 1 are shown in the following Table 1.

TABLE 1 f = 3.77 mm, fB = 0.56 mm, F = 2.88, ω = 31.1°, 2Y = 4.48 mm,
ENTP = 0.00 mm, EXTP = −2.51 mm, H1 = −0.85 mm, H2 = −3.21 mm

| Surface No. | R (mm) | D (mm) | $N_d$ | $v_d$ | Effective radius (mm) |
|---|---|---|---|---|---|
| 1 (Aperture stop) | ∞ | 0.05 | | | 0.66 |
| 2* | 2.127 | 0.77 | 1.53180 | 56.0 | 0.72 |
| 3* | −2.738 | 0.10 | | | 0.82 |
| 4* | −76.221 | 0.40 | 1.58300 | 30.0 | 0.85 |

TABLE 1-continued f = 3.77 mm, fB = 0.56 mm, F = 2.88, ω = 31.1°, 2Y = 4.48 mm,
ENTP = 0.00 mm, EXTP = −2.51 mm, H1 = −0.85 mm, H2 = −3.21 mm

| Surface No. | R (mm) | D (mm) | $N_d$ | $v_d$ | Effective radius (mm) |
|---|---|---|---|---|---|
| 5* | 1.639 | 0.43 | | | 0.91 |
| 6* | −76.766 | 1.13 | 1.53180 | 56.0 | 1.09 |
| 7* | −1.051 | 0.27 | | | 1.28 |
| 8* | −4.582 | 0.55 | 1.53180 | 56.0 | 1.40 |
| 9* | 1.408 | 0.50 | | | 1.83 |
| 10 | ∞ | 0.10 | 1.51633 | 64.1 | 2.02 |
| 11 | ∞ | | | | 2.04 |

Table 2 shows aspheric surface coefficients.

TABLE 2

| | |
|---|---|
| $2^{nd}$ surface | |
| K | −3.83110E−01 |
| A4 | −1.59420E−02 |
| A6 | −1.87930E−02 |
| A8 | −8.41000E−03 |
| $3^{rd}$ surface | |
| K | 1.51530E+00 |
| A4 | 3.57010E−02 |
| A6 | −1.29730E−02 |
| A8 | −1.10080E−02 |
| $4^{th}$ surface | |
| K | −3.00000E+01 |
| A4 | −7.42400E−02 |
| A6 | 7.98010E−02 |
| A8 | −2.55610E−02 |
| $5^{th}$ surface | |
| K | −1.46250E+00 |
| A4 | −8.47190E−02 |
| A6 | 1.17700E−01 |
| A8 | −5.28480E−02 |
| A10 | 7.90620E−03 |
| $6^{th}$ surface | |
| K | −3.00000E+01 |
| A4 | −1.38140E−02 |
| A6 | 2.27930E−02 |
| A8 | 1.32920E−02 |
| A10 | −6.24190E−03 |
| $7^{th}$ surface | |
| K | −3.32490E+00 |
| A4 | −1.14230E−01 |
| A6 | 7.60440E−02 |
| A8 | −2.85310E−02 |
| A10 | 1.48840E−02 |
| A12 | −3.00310E−03 |
| $8^{th}$ surface | |
| K | 7.84530E+00 |
| A4 | −1.60200E−01 |
| A6 | 9.35640E−02 |
| A8 | 6.48200E−03 |
| A10 | −2.13770E−02 |
| A12 | 5.20370E−03 |
| $9^{th}$ surface | |
| K | −9.00230E+00 |
| A4 | −1.31630E−01 |
| A6 | 6.39330E−02 |
| A8 | −1.90110E−02 |
| A10 | 2.68010E−03 |
| A12 | −1.54970E−04 |

Incidentally, an exponentiation of 10 is expressed with E. For example, $2.5 \times 10^{-02}$ is expressed as 2.5E−02.

Table 3 shows lens data of each lens in the image pickup lens.

TABLE 3

| Lens | Forefront surface | Focal length (mm) |
|---|---|---|
| 1 | 2 | 2.382 |
| 2 | 4 | −2.747 |
| 3 | 6 | 1.994 |
| 4 | 8 | −1.962 |

Figure 5:
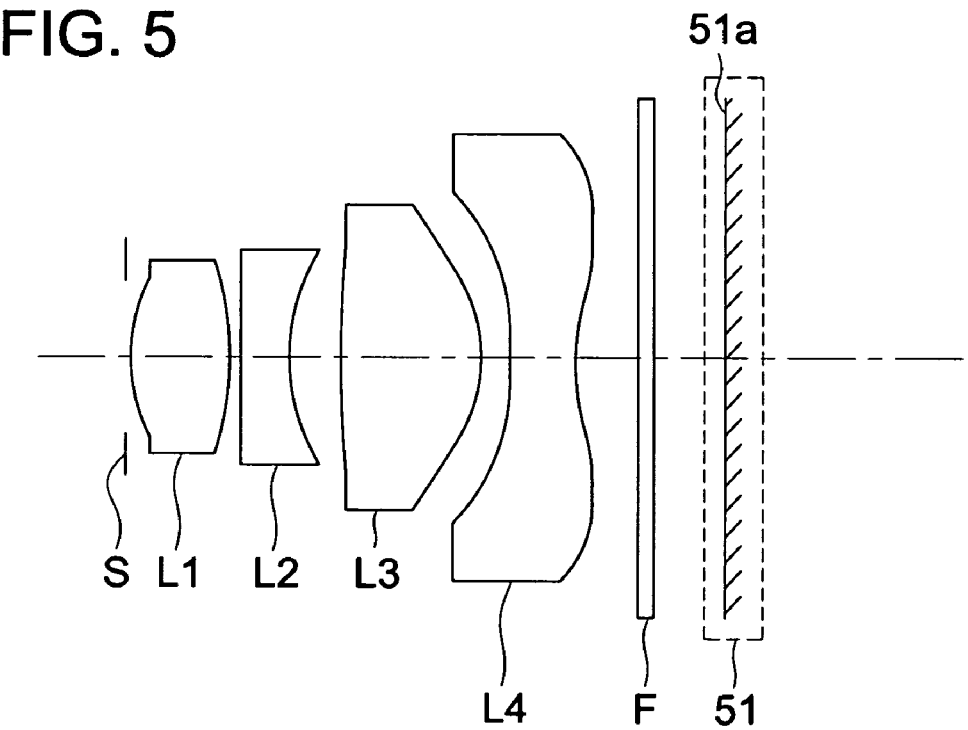
FIG. 5 is a cross section diagram of a lens in Example 1.

FIG. 5 is a cross-sectional view of a lens in Example 1. L1 represents the first lens, L2 represents the second lens, L3 represents the third lens, L4 represents the fourth lens and S represents an aperture stop. F represents a parallel flat plate such as an optical low-pass filter, an infrared-ray cut filter and a seal glass of a solid-state image pickup element.

Figure 6:
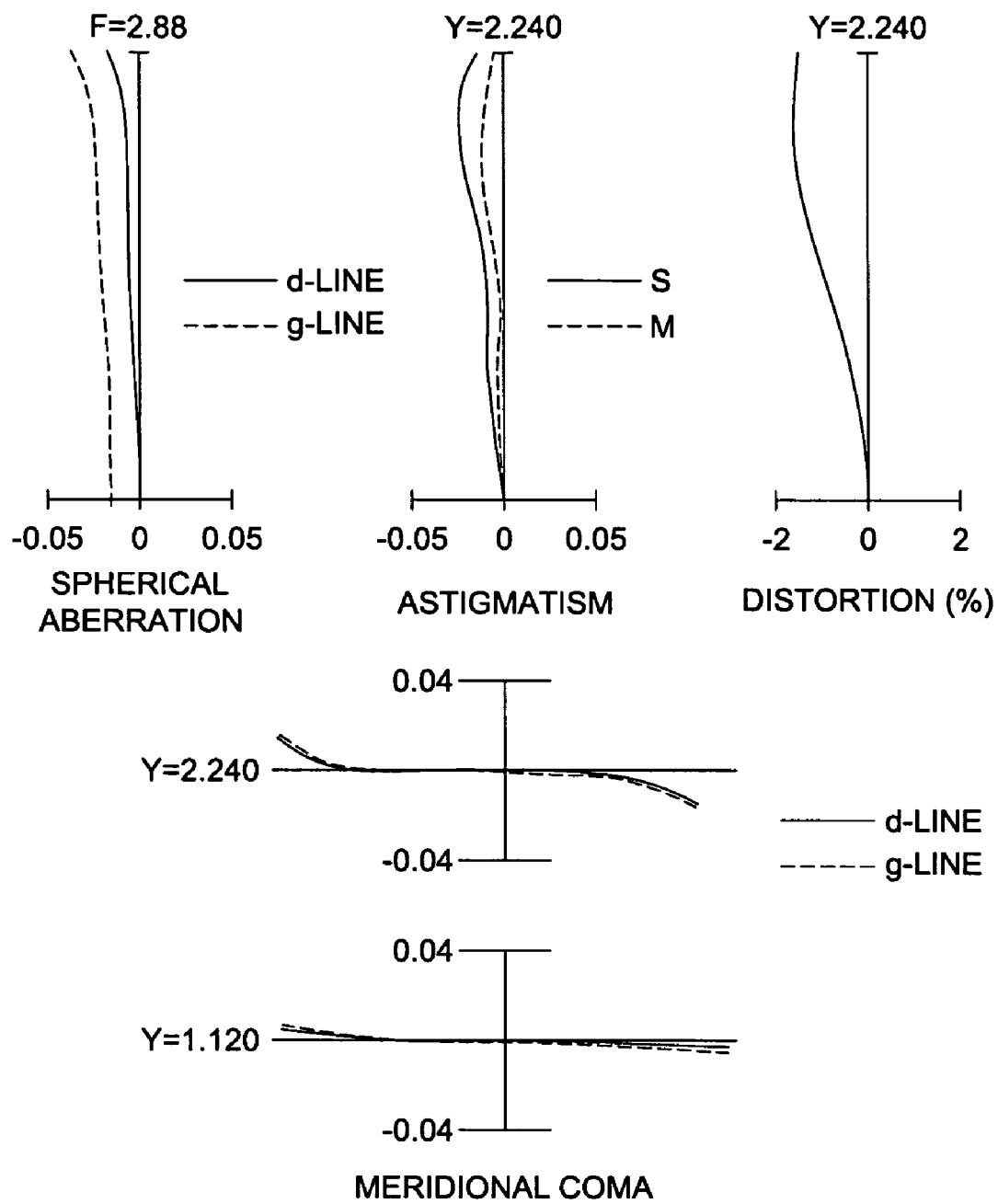
FIG. 6 is an aberration diagram of a lens in the Example 1.

FIG. 6 shows diagrams of aberrations (spherical aberration, astigmatism, distortion and meridional coma) for the lens in Example 1.

In the present example, the first lens, the third lens and the fourth lens are made of polyolefin-based plastic material, and saturated water absorption of the polyolefin-based plastic material is 0.01% or less. The second lens is made of polycarbonate-based plastic material whose saturated water absorption is 0.4%.

Compared with a glass lens, a plastic lens has greater saturated water absorption, and therefore, when humidity is changed suddenly, uneven distribution in water-absorption values is generated transiently, and a refractive index of the plastic lens fails to be uniform, thus, excellent image forming capability tends not to be obtained. For preventing deterioration of capability caused by changes in humidity, it is preferable to use plastic materials all of which have saturated water absorption of 0.7% or less.

Example 2

Table 4 shows lens data.

TABLE 4 f = 4.78 mm, fB = 0.54 mm, F = 2.88, ω = 31.0°, 2Y = 5.67 mm,
ENTP = 0.00 mm, EXTP = −3.08 mm, H1 = −1.53 mm, H2 = −4.24 mm

| Surface No. | R (mm) | D (mm) | $N_d$ | $\nu_d$ | Effective radius (mm) |
|---|---|---|---|---|---|
| 1 (Aperture stop) | ∞ | 0.05 | | | 0.83 |
| 2* | 3.015 | 0.96 | 1.58913 | 61.2 | 0.89 |
| 3* | −5.478 | 0.20 | | | 1.02 |
| 4* | 17.676 | 0.45 | 1.58300 | 30.0 | 1.08 |
| 5* | 2.239 | 0.76 | | | 1.13 |
| 6* | 10.944 | 1.49 | 1.53180 | 56.0 | 1.62 |
| 7* | −1.099 | 0.19 | | | 1.79 |
| 8* | −2.610 | 0.68 | 1.53180 | 56.0 | 1.84 |
| 9* | 1.468 | 0.70 | | | 2.40 |
| 10 | ∞ | 0.10 | 1.51633 | 64.1 | 2.60 |
| 11 | ∞ | | | | 2.63 |

Table 5 shows aspheric surface coefficients.

TABLE 5

$2^{nd}$ surface

| K | 1.95630E−01 |
|---|---|
| A4 | −1.43370E−02 |

TABLE 5-continued

| A6 | −4.83980E−03 |
|---|---|
| A8 | −2.67210E−03 |

$3^{rd}$ surface

| K | −4.85420E+00 |
|---|---|
| A4 | −2.23260E−02 |
| A6 | 1.16410E−02 |
| A8 | −7.83100E−03 |

$4^{th}$ surface

| K | 3.00000E+01 |
|---|---|
| A4 | −4.62350E−02 |
| A6 | 4.25710E−02 |
| A8 | −1.11500E−02 |

$5^{th}$ surface

| K | −7.39250E−01 |
|---|---|
| A4 | −3.24050E−02 |
| A6 | 2.65690E−02 |
| A8 | −4.91350E−03 |
| A10 | 8.18240E−05 |

$6^{th}$ surface

| K | −3.00000E+01 |
|---|---|
| A4 | 9.90260E−03 |
| A6 | −1.94980E−03 |
| A8 | 1.24300E−03 |
| A10 | −2.41220E−04 |

$7^{th}$ surface

| K | −3.84090E+00 |
|---|---|
| A4 | −2.52470E−02 |
| A6 | 2.32570E−02 |
| A8 | −1.09150E−02 |
| A10 | 3.09660E−03 |
| A12 | −3.71490E−04 |

$8^{th}$ surface

| K | 6.08060E−01 |
|---|---|
| A4 | 3.13830E−02 |
| A6 | −7.69820E−03 |
| A8 | 2.32200E−03 |
| A10 | −3.84200E−04 |
| A12 | 4.93520E−05 |

$9^{th}$ surface

| K | −1.06690E+01 |
|---|---|
| A4 | −3.15750E−02 |
| A6 | 8.61270E−03 |
| A8 | −1.67670E−03 |
| A10 | 1.51860E−04 |
| A12 | −4.99920E−06 |

Table 6 shows lens data of each lens in the image pickup lens.

TABLE 6

| Lens | Forefront surface | Focal length (mm) |
|---|---|---|
| 1 | 2 | 3.445 |
| 2 | 4 | −4.444 |
| 3 | 6 | 1.962 |
| 4 | 8 | −1.670 |

Figure 7:
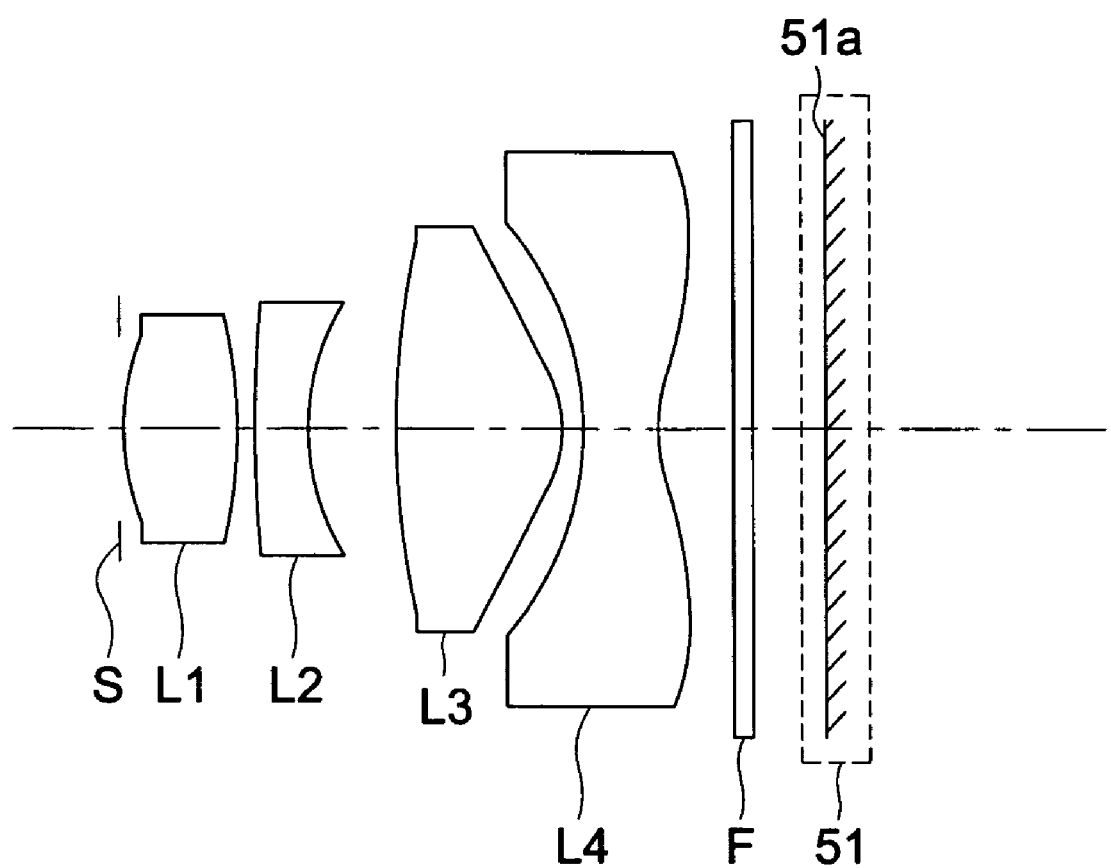
FIG. 7 is a cross section diagram of a lens in Example 2.

FIG. 7 is a cross-sectional view of a lens in Example 2. L1 represents the first lens, L2 represents the second lens, L3 represents the third lens, L4 represents the fourth lens and S represents an aperture stop. F represents a parallel flat plate such as an optical low-pass filter, an infrared-ray cut filter and a seal glass of a solid-state image pickup element.

Figure 8:
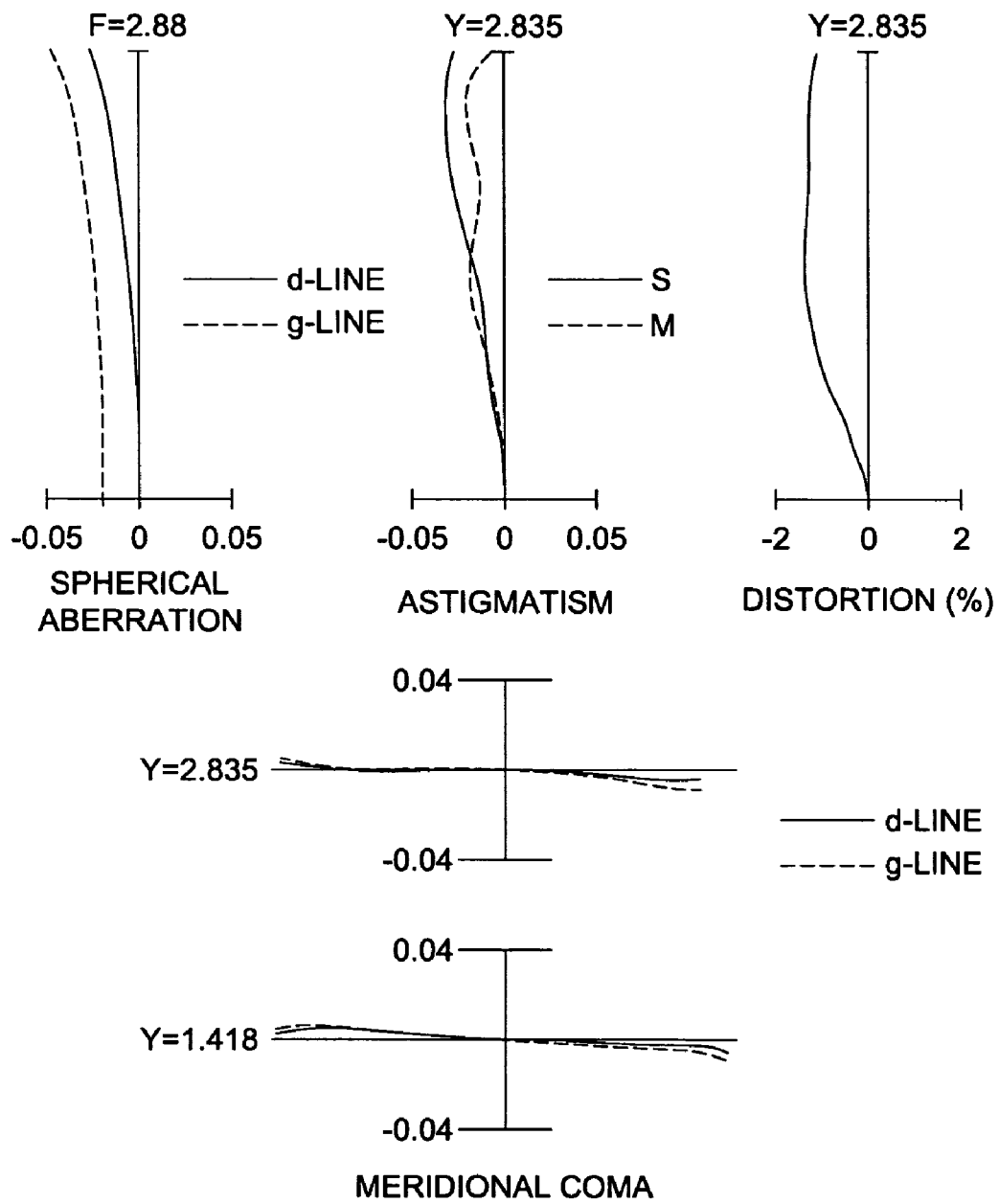
FIG. 8 is an aberration diagram of a lens in the Example 2.

FIG. 8 shows diagrams of aberrations (spherical aberration, astigmatism, distortion and meridional coma) for the lens in Example 2.

In the present example, the first lens is a glass mold lens. The second lens is made of polycarbonate-based plastic material whose saturated water absorption is 0.4%. The third lens and the fourth lens are made of polyolefin-based plastic material whose saturated water absorption is 0.01% or less.

Compared with a glass lens, a plastic lens has greater saturated water absorption, and therefore, when humidity is changed suddenly, uneven distribution in water-absorption values is generated transiently, and a refractive index of the plastic lens fails to be uniform, thus, excellent image forming capability tends not to be obtained. For preventing deterioration of capability caused by changes in humidity, it is preferable to use plastic materials all of which have saturated water absorption of 0.7% or less.

Example 3

Table 7 shows lens data.

TABLE 7

$f = 4.81$ mm, $fB = 0.64$ mm, $F = 2.88$, $\omega = 30.7°$, $2Y = 5.67$ mm,
ENTP = 0.00 mm, EXTP = −3.39 mm, H1 = −0.94 mm, H2 = −4.17 mm

| Surface No. | R (mm) | D (mm) | $N_d$ | $\nu_d$ | Effective radius (mm) |
|---|---|---|---|---|---|
| 1 (Aperture stop) | ∞ | 0.05 | | | 0.84 |
| 2* | 4.500 | 1.18 | 1.53180 | 56.0 | 0.87 |
| 3* | −2.064 | 0.10 | | | 1.09 |
| 4* | −16.220 | 0.88 | 1.58300 | 30.0 | 1.11 |
| 5* | 2.154 | 0.59 | | | 1.23 |
| 6* | −12.911 | 1.28 | 1.53180 | 56.0 | 1.46 |
| 7* | −1.232 | 0.10 | | | 1.65 |
| 8* | −12.262 | 0.99 | 1.53180 | 56.0 | 1.86 |
| 9* | 1.467 | 0.70 | | | 2.41 |
| 10 | ∞ | 0.10 | 1.51633 | 64.1 | 2.59 |
| 11 | ∞ | | | | 2.62 |

Table 8 shows aspheric surface coefficients.

TABLE 8

| 2$^{nd}$ surface | |
|---|---|
| K | −3.24010E+00 |
| A4 | −2.38970E−02 |
| A6 | −8.83750E−03 |
| A8 | −7.83580E−03 |
| 3$^{rd}$ surface | |
| K | 7.76040E−01 |
| A4 | 2.37470E−02 |
| A6 | −5.08230E−03 |
| A8 | −1.81100E−04 |
| 4$^{th}$ surface | |
| K | 6.15920E+00 |
| A4 | −2.06320E−02 |
| A6 | 1.23020E−02 |
| A8 | −1.91510E−03 |
| 5$^{th}$ surface | |
| K | −7.34990E−01 |
| A4 | −3.55870E−02 |
| A6 | 1.64380E−02 |
| A8 | −2.96670E−03 |
| A10 | 4.24730E−05 |
| 6$^{th}$ surface | |
| K | −8.69120E+00 |
| A4 | 1.54380E−02 |

TABLE 8-continued

| | |
|---|---|
| A6 | −1.13490E−02 |
| A8 | 8.91460E−03 |
| A10 | −1.41950E−03 |
| 7$^{th}$ surface | |
| K | −3.40710E+00 |
| A4 | −5.12600E−02 |
| A6 | 2.33220E−02 |
| A8 | −8.00660E−03 |
| A10 | 2.84380E−03 |
| A12 | −2.82030E−04 |
| 8$^{th}$ surface | |
| K | 3.00000E+01 |
| A4 | −5.39370E−02 |
| A6 | 1.60270E−02 |
| A8 | −3.73220E−04 |
| A10 | −4.64960E−04 |
| A12 | 6.77860E−05 |
| 9$^{th}$ surface | |
| K | −7.38900E+00 |
| A4 | −4.00790E−02 |
| A6 | 9.01620E−03 |
| A8 | −1.42280E−03 |
| A10 | 1.19420E−04 |
| A12 | −4.46400E−06 |

Table 9 shows lens data of each lens in the image pickup lens.

TABLE 9

| Lens | Forefront surface | Focal length (mm) |
|---|---|---|
| 1 | 2 | 2.838 |
| 2 | 4 | −3.205 |
| 3 | 6 | 2.467 |
| 4 | 8 | −2.404 |

Figure 9:
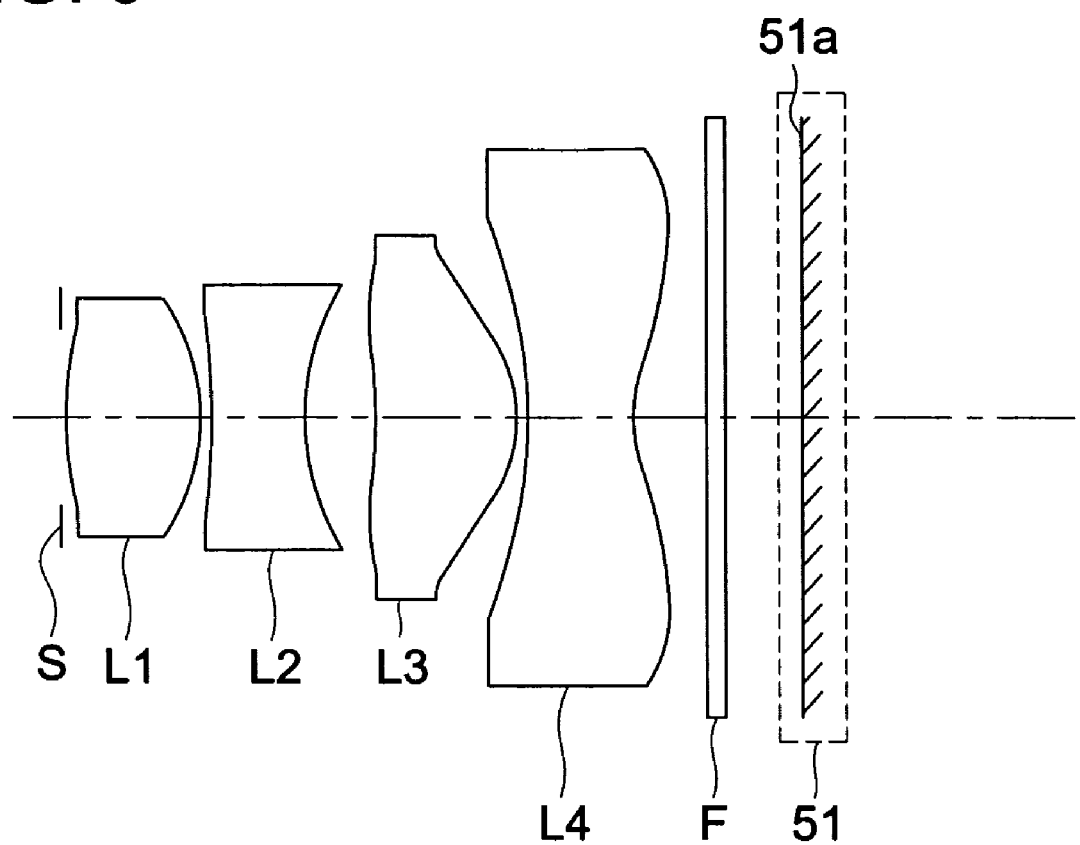
FIG. 9 is a cross section diagram of a lens in Example 3.

FIG. 9 is a cross-sectional view of a lens in Example 3. L1 represents the first lens, L2 represents the second lens, L3 represents the third lens, L4 represents the fourth lens and S represents an aperture stop. F represents a parallel flat plate such as an optical low-pass filter, an infrared-ray cut filter and a seal glass of a solid-state image pickup element.

Figure 10:
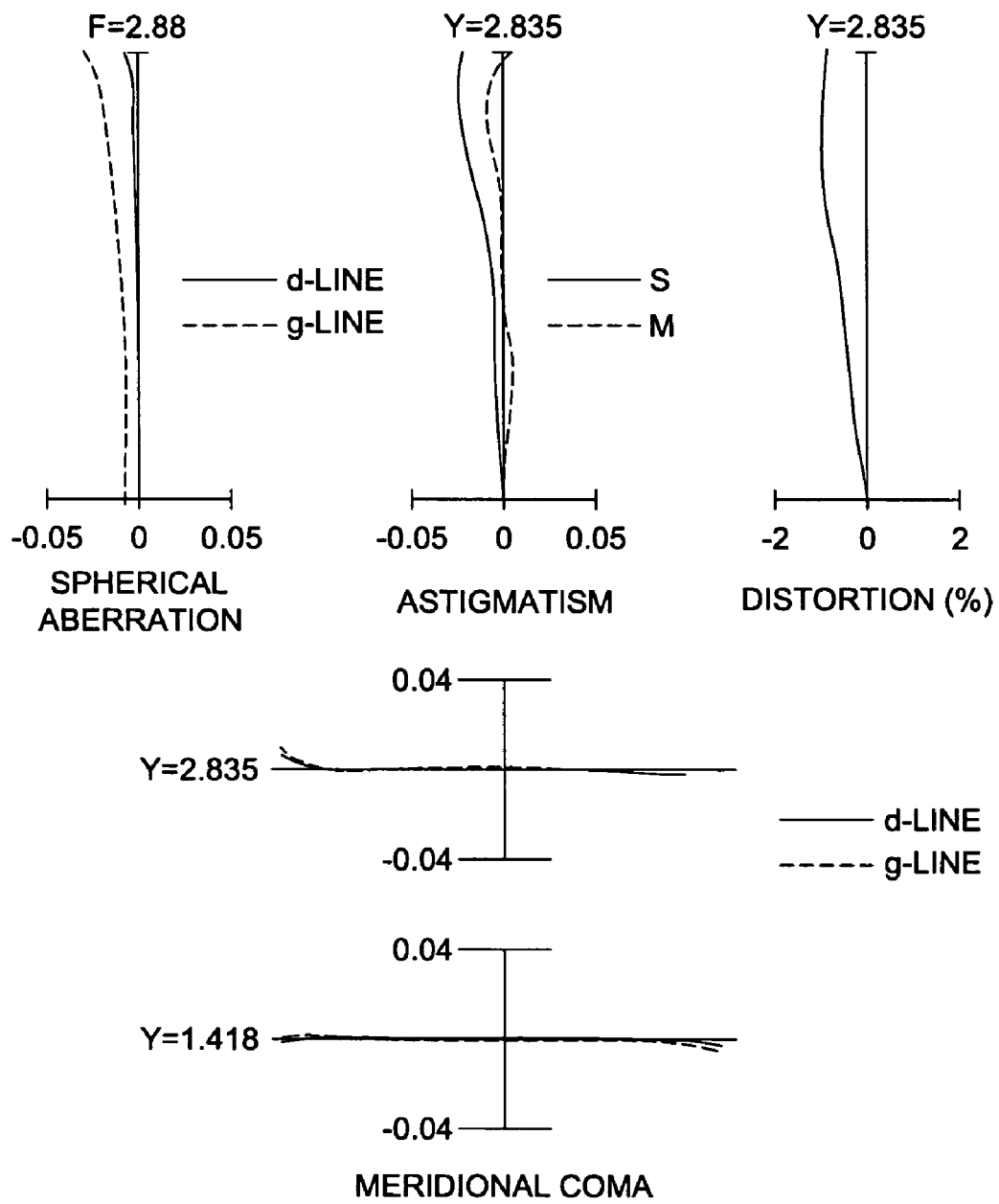
FIG. 10 is an aberration diagram of a lens in the Example 3.

FIG. 10 shows diagrams of aberrations (spherical aberration, astigmatism, distortion and meridional coma) for the lens in Example 3.

In the present example, the first lens, the third lens and the fourth lens are made of polyolefin-based plastic materials whose saturated water absorption is 0.01% or less. The second lens is made of polycarbonate-based plastic material whose saturated water absorption is 0.4%.

Compared with a glass lens, a plastic lens has greater saturated water absorption, and therefore, when humidity is changed suddenly, uneven distribution in water-absorption values is generated transiently, and a refractive index of the plastic lens fails to be uniform, thus, excellent image forming capability tends not to be obtained. For preventing deterioration of capability caused by changes in humidity, it is preferable to use plastic materials all of which have saturated water absorption of 0.7% or less.

Example 4

Table 10 shows lens data.

TABLE 10 f = 4.74 mm, fB = 0.50 mm, F = 3.29, ω = 31.1°, 2Y = 5.67 mm,
ENTP = 0.00 mm, EXTP = −3.29 mm, H1 = −1.18 mm, H2 = −4.24 mm

| Surface No. | R (mm) | D (mm) | $N_d$ | $v_d$ | Effective radius (mm) |
|---|---|---|---|---|---|
| 1 (Aperture stop) | ∞ | 0.05 | | | 0.72 |
| 2* | 4.633 | 0.89 | 1.53180 | 56.0 | 0.74 |
| 3* | −2.153 | 0.10 | | | 0.92 |
| 4* | 33.315 | 0.64 | 1.60700 | 27.0 | 0.96 |
| 5* | 2.263 | 0.63 | | | 1.05 |
| 6* | −3.838 | 1.11 | 1.51760 | 63.5 | 1.21 |
| 7* | −1.462 | 0.73 | | | 1.47 |
| 8* | −11.778 | 0.85 | 1.53180 | 56.0 | 1.90 |
| 9* | 2.364 | 0.60 | | | 2.41 |
| 10 | ∞ | 0.10 | 1.51633 | 64.1 | 2.63 |
| 11 | ∞ | | | | 2.65 |

Table 11 shows aspheric surface coefficients.

TABLE 11

| $2^{nd}$ surface | |
|---|---|
| K | −8.41970E+00 |
| A4 | −3.50750E−02 |
| A6 | −1.43520E−02 |
| A8 | −2.23070E−02 |
| $3^{rd}$ surface | |
| K | 1.98210E+00 |
| A4 | 1.17860E−02 |
| A6 | 5.09100E−03 |
| A8 | −4.41260E−03 |
| $4^{th}$ surface | |
| K | −2.72990E+01 |
| A4 | −3.46520E−02 |
| A6 | 2.88010E−02 |
| A8 | −1.11280E−02 |
| $5^{th}$ surface | |
| K | −1.31070E+00 |
| A4 | −4.09160E−02 |
| A6 | 2.85130E−02 |
| A8 | −1.06870E−02 |
| A10 | 2.86580E−03 |
| $6^{th}$ surface | |
| K | 5.87610E+00 |
| A4 | −4.26130E−03 |
| A6 | 2.92940E−03 |
| A8 | 1.44780E−02 |
| A10 | 1.01620E−03 |
| $7^{th}$ surface | |
| K | −2.54370E+00 |
| A4 | −5.27450E−02 |
| A6 | 1.50140E−02 |
| A8 | −3.74840E−03 |
| A10 | 2.82990E−03 |
| A12 | −1.25960E−04 |
| $8^{th}$ surface | |
| K | 3.00000E+01 |
| A4 | −5.44300E−02 |
| A6 | 1.84830E−02 |
| A8 | −1.24110E−03 |
| A10 | −3.94450E−04 |
| A12 | 6.31330E−05 |

TABLE 11-continued

| $9^{th}$ surface | |
|---|---|
| K | −7.60720E+00 |
| A4 | −4.93890E−02 |
| A6 | 1.24030E−02 |
| A8 | −2.17960E−03 |
| A10 | 2.18890E−04 |
| A12 | −1.02730E−05 |

Table 12 shows lens data of each lens in the image pickup lens.

TABLE 12

| Lens | Forefront surface | Focal length (mm) |
|---|---|---|
| 1 | 2 | 2.896 |
| 2 | 4 | −4.031 |
| 3 | 6 | 3.934 |
| 4 | 8 | −3.627 |

Figure 11:
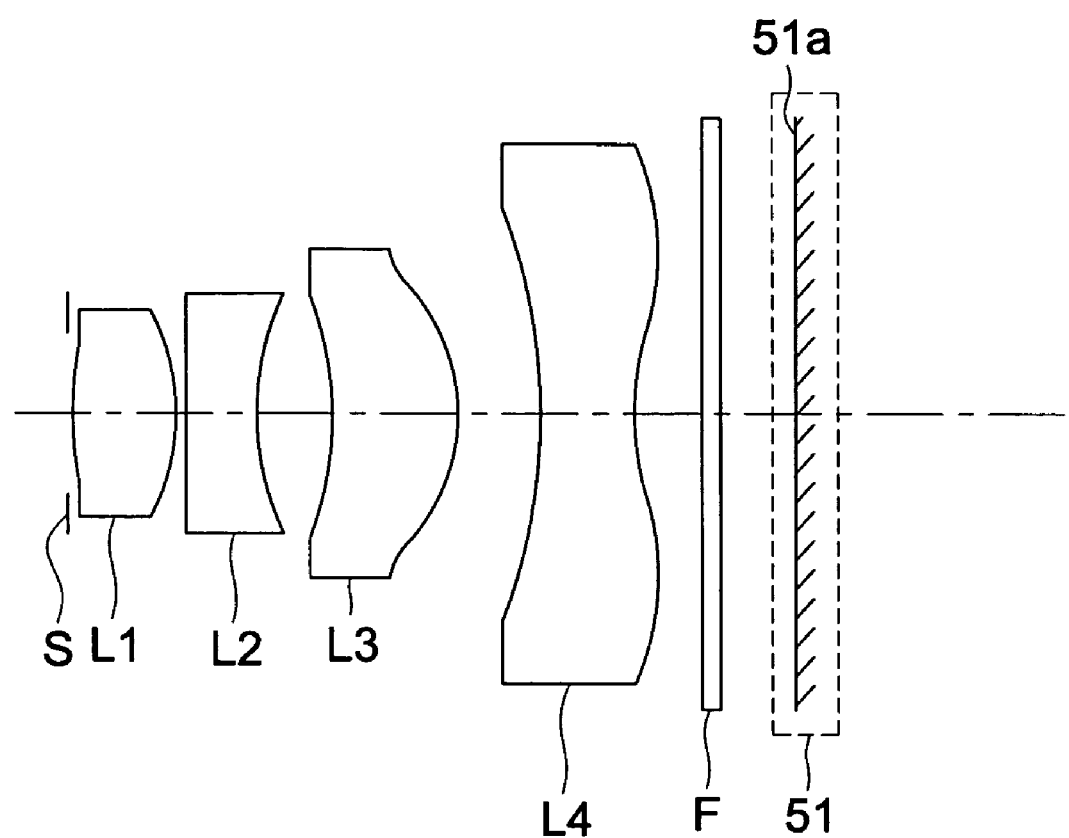
FIG. 11 is a cross section diagram of a lens in Example 4.

FIG. 11 is cross-sectional view of a lens in Example 4. L1 represents the first lens, L2 represents the second lens, L3 represents the third lens, L4 represents the fourth lens and S represents an aperture stop. F represents a parallel flat plate such as an optical low-pass filter, an infrared-ray cut filter and a seal glass of a solid-state image pickup element.

Figure 12:
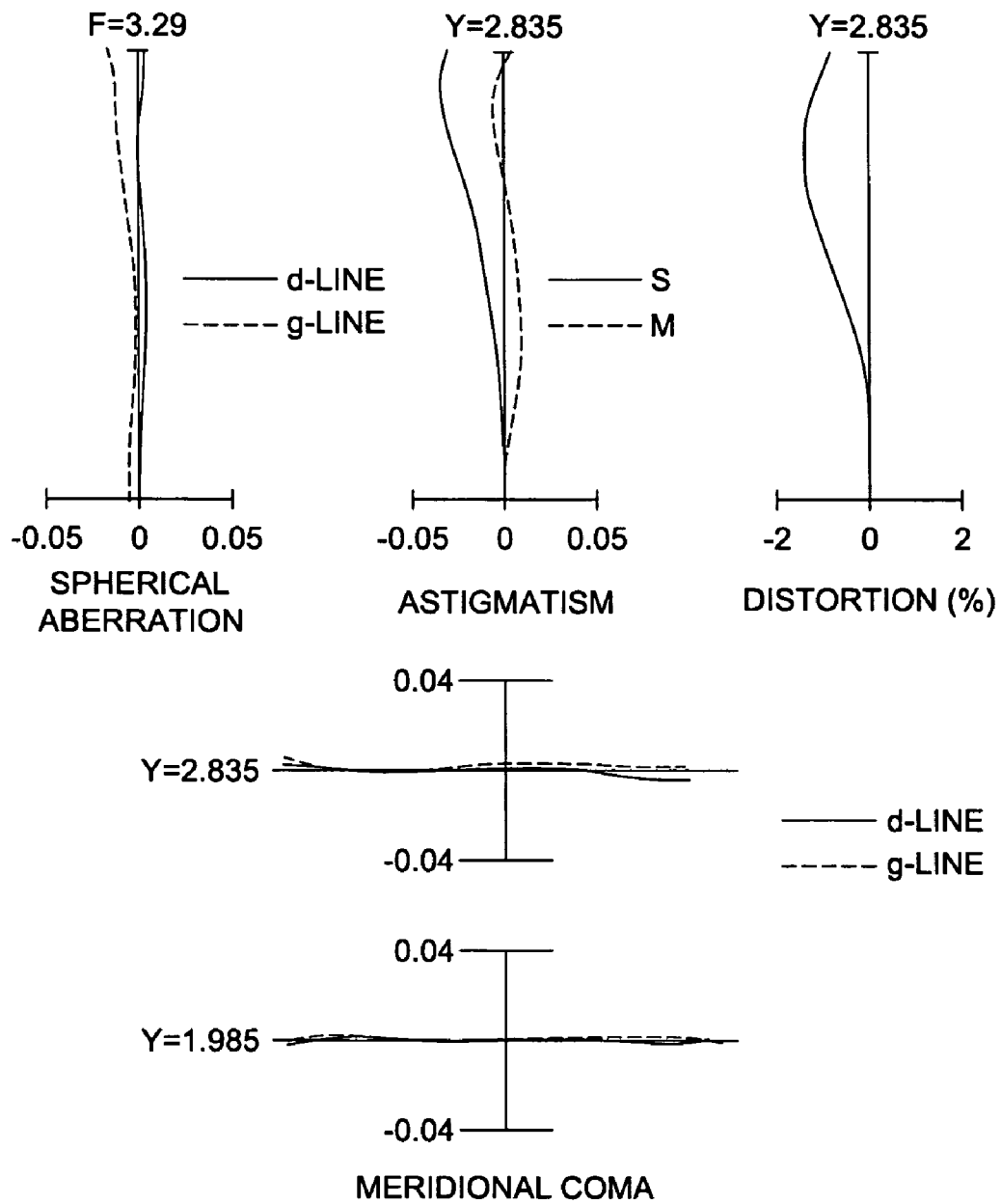
FIG. 12 is an aberration diagram of a lens in the Example 4.

FIG. 12 shows diagrams of aberrations (spherical aberration, astigmatism, distortion and meridional coma) for the lens in Example 4.

In the present example, the first lens and the fourth lens are made of polyolefin-based plastic materials whose saturated water absorption is 0.01% or less. The second lens is made of polyester-based plastic material whose saturated water absorption is 0.7%. The third lens is a glass mold lens.

Compared with a glass lens, a plastic lens has greater saturated water absorption, and therefore, when humidity is changed suddenly, uneven distribution in water-absorption values is generated transiently, and a refractive index of the plastic lens fails to be uniform, thus, excellent image forming capability tends not to be obtained. For controlling deterioration of capability caused by changes in humidity, it is preferable to use plastic materials all of which have saturated water absorption of 0.7% or less.

Example 5

Table 13 shows lens data.

TABLE 13 f = 4.72 mm, fB = 0.66 mm, F = 2.88, ω = 31.3°, 2Y = 5.67 mm,
ENTP = 0.00 mm, EXTP = −3.17 mm, H1 = −1.08 mm, H2 = −4.06 mm

| Surface No. | R (mm) | D (mm) | $N_d$ | $v_d$ | Effective radius (mm) |
|---|---|---|---|---|---|
| 1 (Aperture stop) | ∞ | 0.05 | | | 0.82 |
| 2* | 3.822 | 1.06 | 1.53180 | 56.0 | 0.86 |
| 3* | −2.071 | 0.10 | | | 1.06 |
| 4* | −29.044 | 0.63 | 1.58300 | 30.0 | 1.09 |
| 5* | 2.040 | 0.68 | | | 1.18 |
| 6* | −7.149 | 1.26 | 1.53180 | 56.0 | 1.40 |
| 7* | −1.227 | 0.38 | | | 1.63 |
| 8* | −7.023 | 0.68 | 1.53180 | 56.0 | 1.88 |

TABLE 13-continued f = 4.72 mm, fB = 0.66 mm, F = 2.88, ω = 31.3°, 2Y = 5.67 mm,
ENTP = 0.00 mm, EXTP = −3.17 mm, H1 = −1.08 mm, H2 = −4.06 mm

| Surface No. | R (mm) | D (mm) | $N_d$ | $v_d$ | Effective radius (mm) |
|---|---|---|---|---|---|
| 9* | 1.627 | 0.60 | | | 2.39 |
| 10 | ∞ | 0.10 | 1.51633 | 64.1 | 2.59 |
| 11 | ∞ | | | | 2.61 |

Table 14 shows aspheric surface coefficients.

TABLE 14

| | |
|---|---|
| $2^{nd}$ surface | |
| K | −3.49490E+00 |
| A4 | −2.72650E−02 |
| A6 | −8.09010E−03 |
| A8 | −1.83980E−02 |
| $3^{rd}$ surface | |
| K | 1.25440E+00 |
| A4 | 1.94080E−02 |
| A6 | −3.14620E−03 |
| A8 | −1.22570E−03 |
| $4^{th}$ surface | |
| K | −3.00000E+01 |
| A4 | −4.21100E−02 |
| A6 | 2.64080E−02 |
| A8 | −6.52630E−03 |
| $5^{th}$ surface | |
| K | −1.37950E+00 |
| A4 | −4.06060E−02 |
| A6 | 3.28620E−02 |
| A8 | −8.66440E−03 |
| A10 | 5.36120E−04 |
| $6^{th}$ surface | |
| K | 1.23650E+01 |
| A4 | 8.79350E−04 |
| A6 | −4.27560E−03 |
| A8 | 8.67760E−03 |
| A10 | −1.31880E−03 |
| $7^{th}$ surface | |
| K | −3.19980E+00 |
| A4 | −5.88060E−02 |
| A6 | 2.00910E−02 |
| A8 | −5.25780E−03 |
| A10 | 1.49150E−03 |
| A12 | −1.02830E−04 |
| $8^{th}$ surface | |
| K | 1.04460E+01 |
| A4 | −5.29470E−02 |
| A6 | 2.00920E−02 |
| A8 | −1.27250E−03 |
| A10 | −6.68500E−04 |
| A12 | 1.11340E−04 |
| $9^{th}$ surface | |
| K | −8.52140E+00 |
| A4 | −5.10910E−02 |
| A6 | 1.42250E−02 |
| A8 | −2.62840E−03 |
| A10 | 2.46520E−04 |
| A12 | −1.01620E−05 |

Table 15 shows lens data of each lens in the image pickup lens.

TABLE 15

| Lens | Forefront surface | Focal length (mm) |
|---|---|---|
| 1 | 2 | 2.694 |
| 2 | 4 | −3.245 |
| 3 | 6 | 2.594 |
| 4 | 8 | −2.418 |

Figure 13:
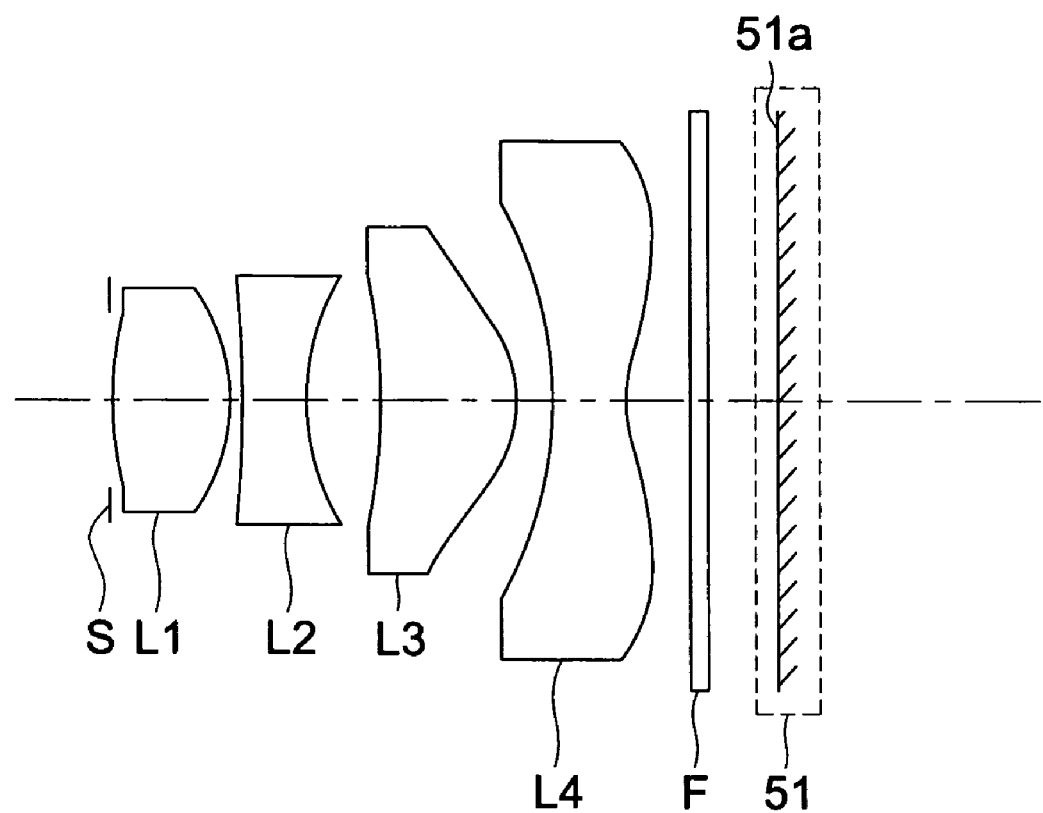
FIG. 13 is a cross section diagram of a lens in Example 5.

FIG. 13 is a cross-sectional view of a lens in Example 5. L1 represents the first lens, L2 represents the second lens, L3 represents the third lens, L4 represents the fourth lens and S represents an aperture stop. F represents a parallel flat plate such as an optical low-pass filter, an infrared-ray cut filter and a seal glass of a solid-state image pickup element.

Figure 14:
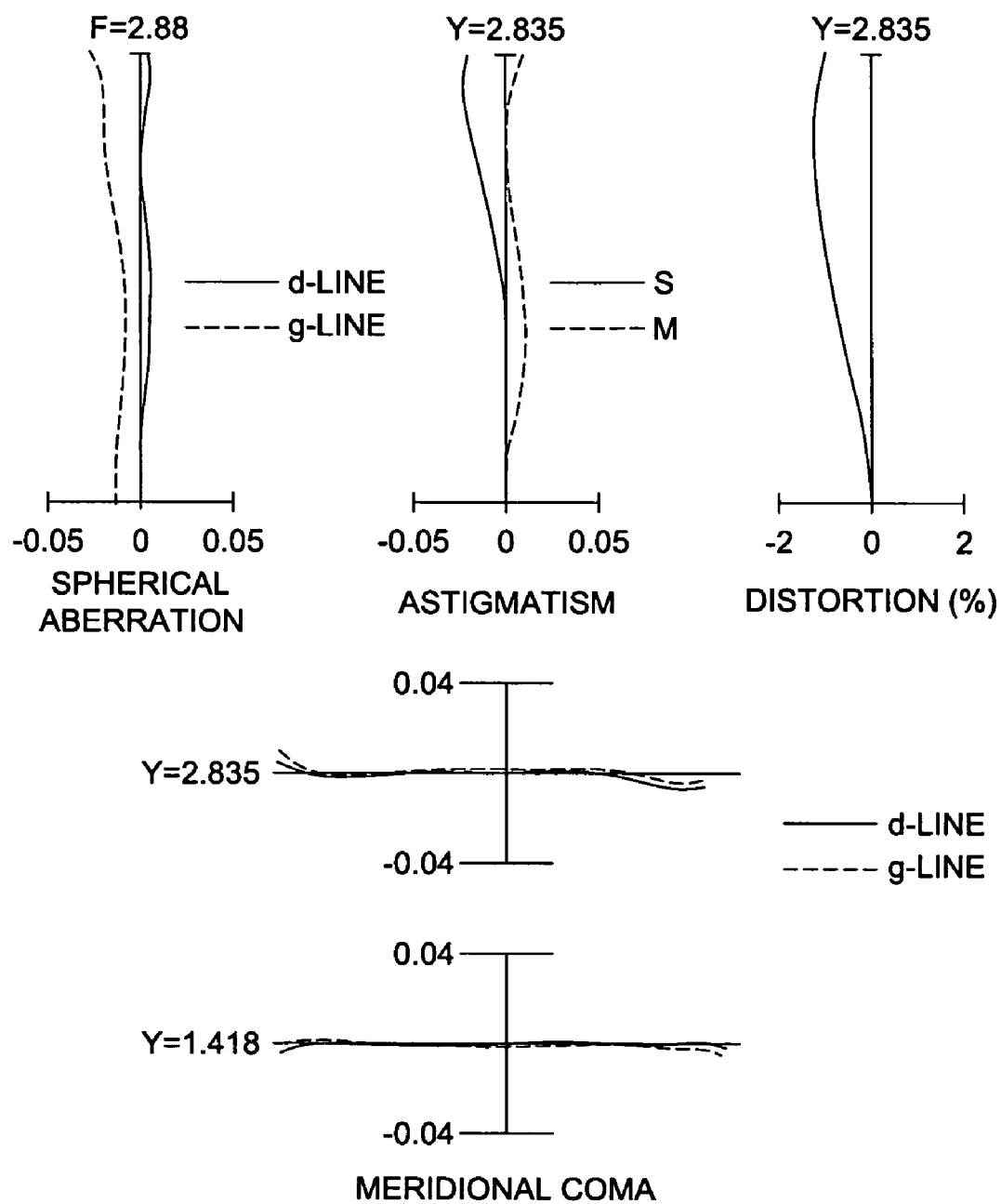
FIG. 14 is an aberration diagram of a lens in the Example 5.

FIG. 14 shows diagrams of aberrations (spherical aberration, astigmatism, distortion and meridional coma) for the lens in Example 5.

In the present example, the first lens, the third lens and the fourth lens are made of polyolefin-based plastic materials whose saturated water absorption is 0.01% or less. The second lens is made of polycarbonate-based plastic material whose saturated water absorption is 0.4%.

Compared with a glass lens, a plastic lens has greater saturated water absorption, and therefore, when humidity is changed suddenly, uneven distribution in water-absorption values is generated transiently, and a refractive index of the plastic lens fails to be uniform, thus, excellent image forming capability tends not to be obtained. For controlling deterioration of capability caused by changes in humidity, it is preferable to use plastic materials all of which have saturated water absorption of 0.7% or less.

Example 6

Table 16 shows lens data.

TABLE 16 f = 5.65 mm, fB = 0.75 mm, F = 2.88, ω = 31.9°, 2Y = 7.13 mm,
ENTP = 0.00 mm, EXTP = −3.39 mm, H1 = −2.05 mm, H2 = −4.90 mm

| Surface No. | R (mm) | D (mm) | $N_d$ | $v_d$ | Effective radius (mm) |
|---|---|---|---|---|---|
| 1 (Aperture stop) | ∞ | 0.05 | | | 0.98 |
| 2* | 2.032 | 1.17 | 1.48749 | 70.2 | 1.15 |
| 3* | −19.387 | 0.07 | | | 1.21 |
| 4* | 7.124 | 0.40 | 1.60700 | 27.0 | 1.20 |
| 5* | 2.859 | 0.89 | | | 1.18 |
| 6* | −4.305 | 1.34 | 1.53180 | 56.0 | 1.36 |
| 7* | −1.347 | 0.20 | | | 1.92 |
| 8* | −11.786 | 0.65 | 1.53180 | 56.0 | 2.36 |
| 9* | 1.608 | 0.80 | | | 2.85 |
| 10 | ∞ | 0.10 | 1.51633 | 64.1 | 3.25 |
| 11 | ∞ | | | | 3.27 |

Table 17 shows aspheric surface coefficients.

TABLE 17

| | |
|---|---|
| $2^{nd}$ surface | |
| K | −6.77660E−01 |
| A4 | 4.62480E−03 |
| A6 | 2.46200E−03 |
| A8 | −4.21560E−03 |

TABLE 17-continued

*3rd surface*

| | |
|---|---|
| K | −3.00000E+01 |
| A4 | −2.22180E−02 |
| A6 | −2.16190E−02 |
| A8 | 4.80430E−03 |

*4th surface*

| | |
|---|---|
| K | 6.25240E+00 |
| A4 | −2.01800E−02 |
| A6 | −3.08890E−02 |
| A8 | 1.40470E−02 |

*5th surface*

| | |
|---|---|
| K | 2.58690E+00 |
| A4 | −3.44720E−03 |
| A6 | −1.37270E−02 |
| A8 | 4.12970E−03 |
| A10 | 2.59640E−03 |

*6th surface*

| | |
|---|---|
| K | 7.23720E+00 |
| A4 | 6.25760E−03 |
| A6 | −1.44840E−02 |
| A8 | 7.58040E−03 |
| A10 | −2.21320E−03 |

*7th surface*

| | |
|---|---|
| K | −4.13500E+00 |
| A4 | −3.78540E−02 |
| A6 | 9.91630E−03 |
| A8 | −3.54260E−03 |
| A10 | 1.48420E−03 |
| A12 | −2.03340E−04 |

*8th surface*

| | |
|---|---|
| K | 1.79630E+01 |
| A4 | −5.00980E−02 |
| A6 | 8.74820E−03 |
| A8 | 9.52360E−04 |
| A10 | −3.00310E−04 |
| A12 | 1.80340E−05 |

*9th surface*

| | |
|---|---|
| K | −8.66580E+00 |
| A4 | −4.30340E−02 |
| A6 | 9.50440E−03 |
| A8 | −1.56220E−03 |
| A10 | 1.39870E−04 |
| A12 | −5.07140E−06 |

Table 18 shows lens data of each lens in the image pickup lens.

TABLE 18

| Lens | Forefront surface | Focal length (mm) |
|---|---|---|
| 1 | 2 | 3.842 |
| 2 | 4 | −8.155 |
| 3 | 6 | 3.184 |
| 4 | 8 | −2.617 |

Figure 15:
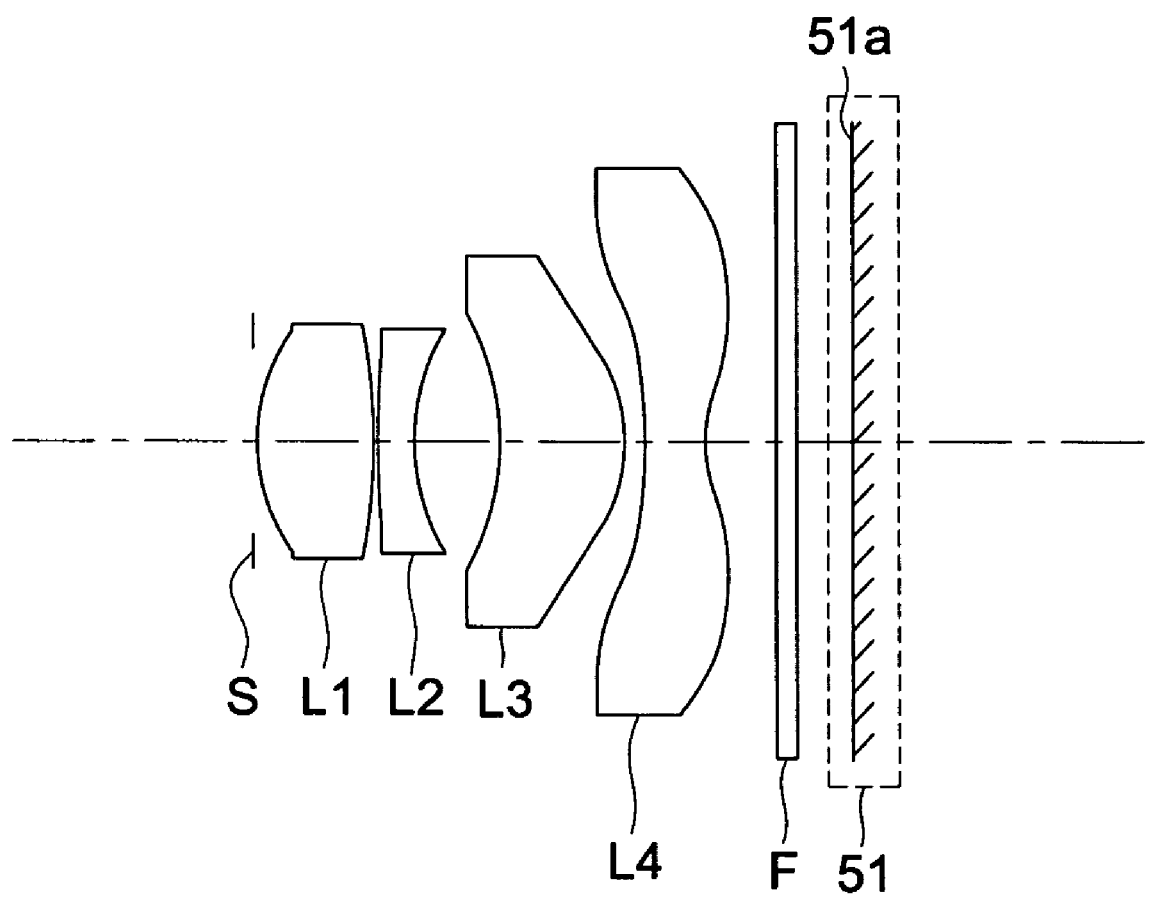
FIG. 15 is a cross section diagram of a lens in Example 6.

FIG. 15 is a cross-sectional view of a lens in Example 6. L1 represents the first lens, L2 represents the second lens, L3 represents the third lens, L4 represents the fourth lens and S represents an aperture stop. F represents a parallel flat plate such as an optical low-pass filter, an infrared-ray cut filter and a seal glass of a solid-state image pickup element.

Figure 16:
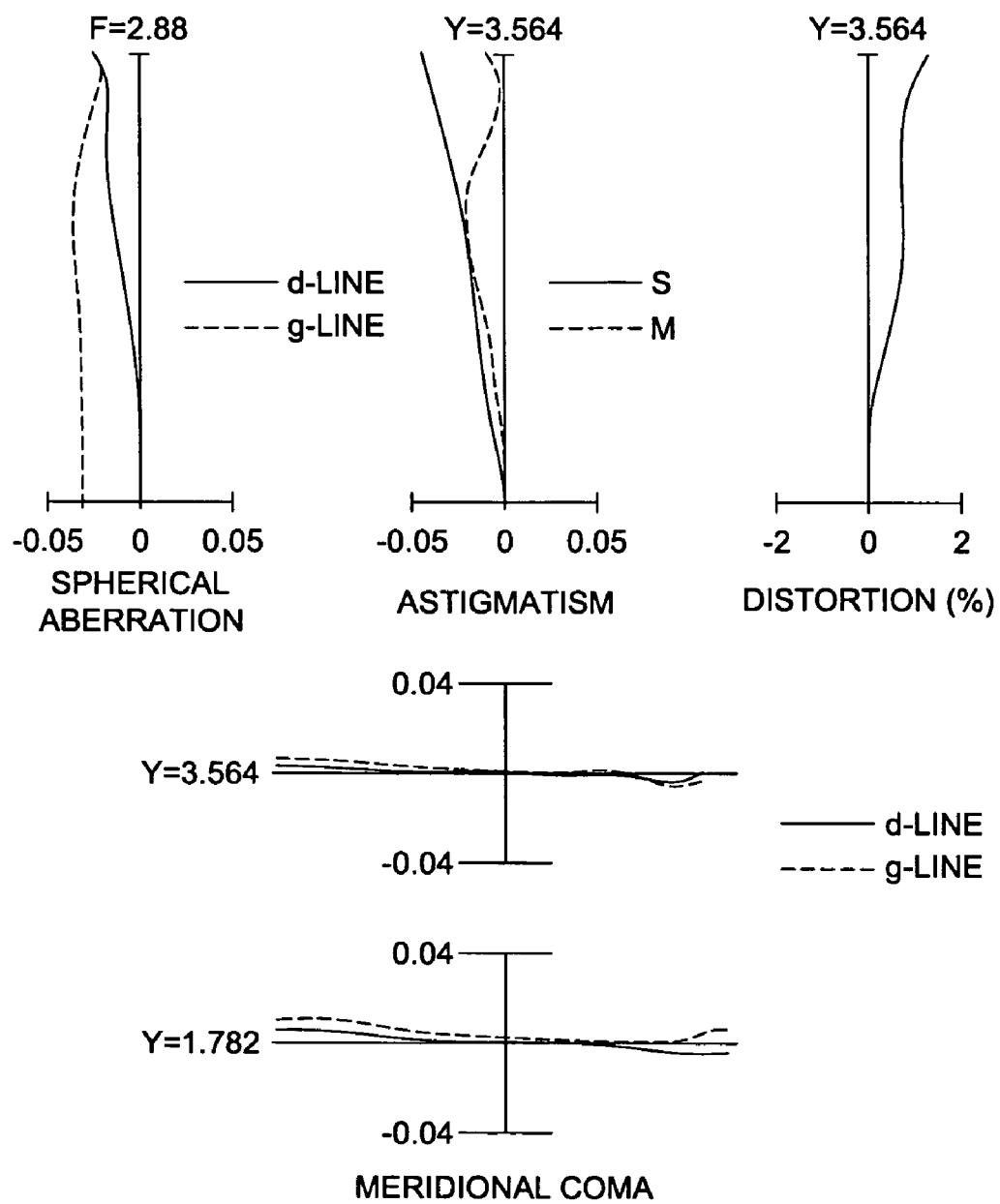
FIG. 16 is an aberration diagram of a lens in the Example 6.

FIG. 16 shows diagrams of aberrations (spherical aberration, astigmatism, distortion and meridional coma) for the lens in Example 6.

In the present example, the first lens is a glass mold lens. The second lens is made of polyester-based plastic material whose saturated water absorption is 0.7%. The third lens and the fourth lens are made of polyolefin-based plastic materials whose saturated water absorption is 0.01% or less.

Compared with a glass lens, a plastic lens has greater saturated water absorption, and therefore, when humidity is changed suddenly, uneven distribution in water-absorption values is generated transiently, and a refractive index of the plastic lens fails to be uniform, thus, excellent image forming capability tends not to be obtained. For controlling deterioration of capability caused by changes in humidity, it is preferable to use plastic materials all of which have saturated water absorption of 0.7% or less.

Example 7

Table 19 shows lens data.

TABLE 19 f = 5.70 mm, fB = 0.67 mm, F = 2.88, ω = 31.8°, 2Y = 7.13 mm,
ENTP = 0.00 mm, EXTP = −3.18 mm, H1 = −2.73 mm, H2 = −5.03 mm

| Surface No. | R(mm) | D (mm) | $N_d$ | $v_d$ | Effective radius (mm) |
|---|---|---|---|---|---|
| 1 (Aperture stop) | ∞ | 0.05 | | | 0.99 |
| 2* | 1.848 | 1.14 | 1.48749 | 70.2 | 1.31 |
| 3* | −95.262 | 0.07 | | | 1.30 |
| 4* | 5.460 | 0.40 | 1.80518 | 25.4 | 1.27 |
| 5* | 2.713 | 0.92 | | | 1.18 |
| 6* | −4.199 | 1.10 | 1.58144 | 40.7 | 1.38 |
| 7* | −1.479 | 0.32 | | | 1.89 |
| 8* | −7.764 | 0.65 | 1.65844 | 50.9 | 2.36 |
| 9* | 2.299 | 0.80 | | | 2.79 |
| 10 | ∞ | 0.10 | 1.51633 | 64.1 | 3.31 |
| 11 | ∞ | | | | 3.33 |

Table 20 shows aspheric surface coefficients.

TABLE 20

*2nd surface*

| | |
|---|---|
| K | −5.79630E−01 |
| A4 | 9.62300E−03 |
| A6 | 1.93830E−03 |
| A8 | −1.22650E−03 |

*3rd surface*

| | |
|---|---|
| K | 3.00000E+01 |
| A4 | −1.21570E−02 |
| A6 | −2.21370E−02 |
| A8 | 7.62780E−03 |

*4th surface*

| | |
|---|---|
| K | 1.68540E+00 |
| A4 | −1.91900E−02 |
| A6 | −2.83860E−02 |
| A8 | 1.42110E−02 |

*5th surface*

| | |
|---|---|
| K | 3.30870E+00 |
| A4 | −1.49880E−02 |
| A6 | −2.13120E−02 |
| A8 | 8.52660E−03 |
| A10 | 2.43780E−04 |

*6th surface*

| | |
|---|---|
| K | 6.83760E+00 |
| A4 | 1.53030E−02 |
| A6 | −2.14280E−02 |
| A8 | 1.23020E−02 |
| A10 | −3.46210E−03 |

TABLE 20-continued

| | | 7th surface |
|---|---|---|
| | K | −4.16600E+00 |
| | A4 | −3.70590E−02 |
| | A6 | 8.54940E−03 |
| | A8 | −2.78960E−03 |
| | A10 | 1.62770E−03 |
| | A12 | −2.65750E−04 |
| | | 8th surface |
| | K | 3.50290E+00 |
| | A4 | −5.37700E−02 |
| | A6 | 9.62950E−03 |
| | A8 | 9.40740E−04 |
| | A10 | −3.12050E−04 |
| | A12 | 1.83590E−05 |
| | | 9th surface |
| | K | −1.57170E+01 |
| | A4 | −4.78030E−02 |
| | A6 | 9.91220E−03 |
| | A8 | −1.55660E−03 |
| | A10 | 1.33700E−04 |
| | A12 | −4.61800E−06 |

Table 21 shows lens data of each lens in the image pickup lens.

TABLE 21

| Lens | Forefront surface | Focal length (mm) |
|---|---|---|
| 1 | 2 | 3.733 |
| 2 | 4 | −7.162 |
| 3 | 6 | 3.418 |
| 4 | 8 | −2.627 |

Figure 17:
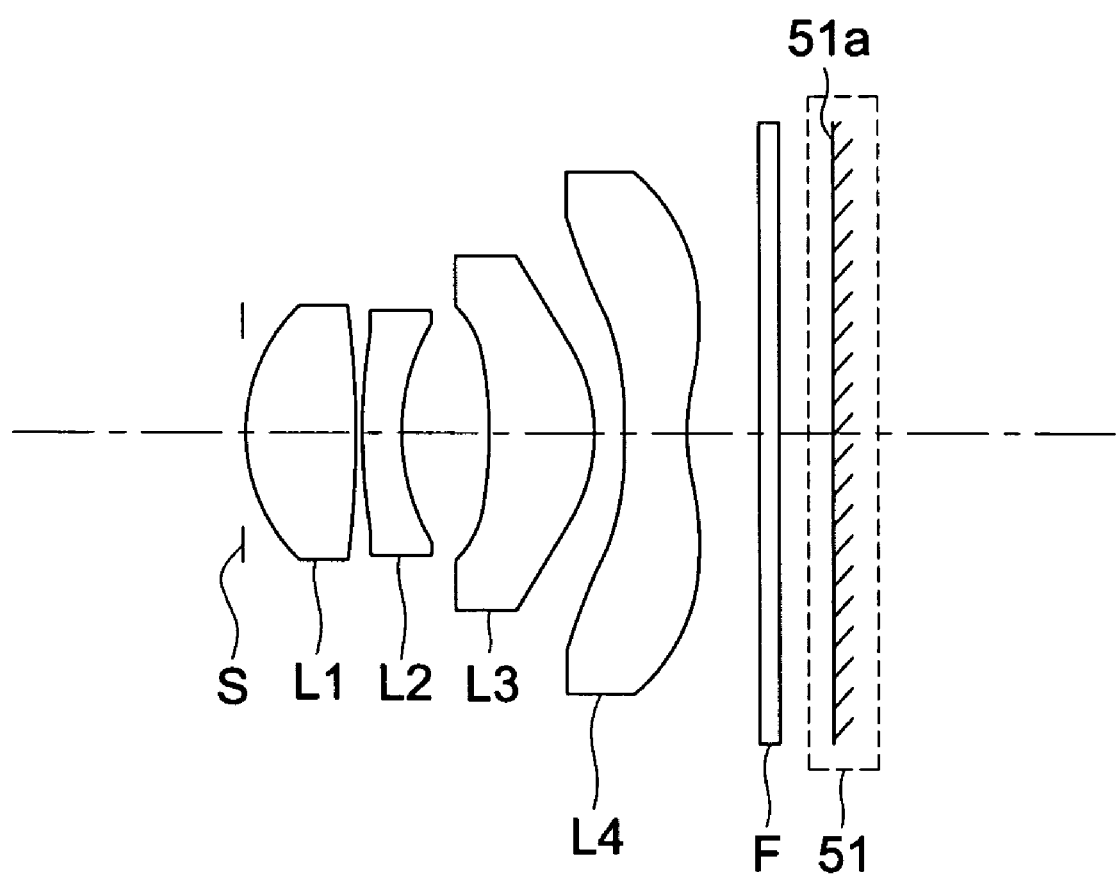
FIG. 17 is a cross section diagram of a lens in Example 7.

FIG. 17 is a cross-sectional view of a lens in Example 7. L1 represents the first lens, L2 represents the second lens, L3 represents the third lens, L4 represents the fourth lens and S represents an aperture stop. F represents a parallel flat plate such as an optical low-pass filter, an infrared-ray cut filter and a seal glass of a solid-state image pickup element.

Figure 18:
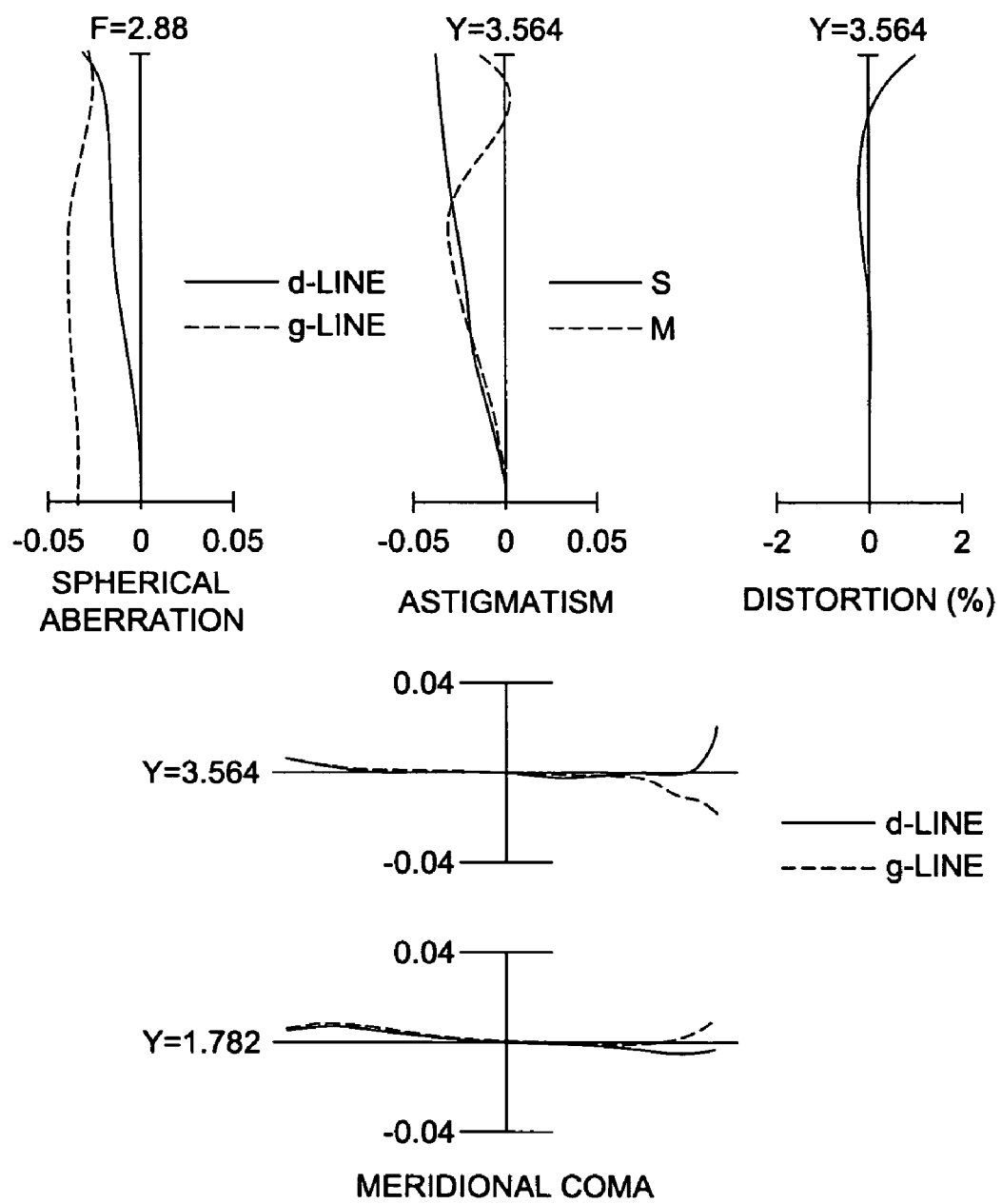
FIG. 18 is an aberration diagram of a lens in the Example 7.

FIG. 18 shows diagrams of aberrations (spherical aberration, astigmatism, distortion and meridional coma) for the lens in Example 7.

In the present example, each of the first lens up to the fourth lens is a glass mold lens. If all of the first lens through the fourth lens are glass lenses as in the present Example, the lenses can be made to be an image pickup lens having sufficient heat resistance, which can be used also for the occasion of soldering under automatic mounting employing a reflow process when mounting an image pickup apparatus on a circuit base board.

Example 8

Table 22 shows lens data.

TABLE 22 f = 4.74 mm, fB = 0.81 mm, F = 2.88, ω = 31.1°, 2Y = 5.67 mm,
ENTP = 0.00 mm, EXTP = −3.21 mm, H1 = −0.85 mm, H2 = −3.93 mm

| Surface No. | R (mm) | D (mm) | $N_d$ | $v_d$ | Effective radius (mm) |
|---|---|---|---|---|---|
| 1 (Aperture stop) | ∞ | 0.05 | | | 0.82 |
| 2* | 3.655 | 1.02 | 1.53180 | 56.0 | 0.86 |
| 3* | −2.318 | 0.10 | | | 1.06 |
| 4* | 7.130 | 0.45 | 1.60700 | 27.0 | 1.10 |
| 5* | 1.745 | 0.65 | | | 1.15 |
| 6* | −5.225 | 1.50 | 1.53180 | 56.0 | 1.33 |
| 7* | −1.144 | 0.24 | | | 1.64 |
| 8* | −8.592 | 0.69 | 1.53180 | 56.0 | 1.88 |
| 9* | 1.455 | 0.60 | | | 2.36 |
| 10 | ∞ | 0.10 | 1.51633 | 64.1 | 2.55 |
| 11 | ∞ | | | | 2.57 |

Table 23 shows aspheric surface coefficients.

TABLE 23

| | 2nd surface |
|---|---|
| K | −2.78090E+00 |
| A4 | −2.70050E−02 |
| A6 | −1.21290E−02 |
| A8 | −1.60040E−02 |
| | 3rd surface |
| K | 1.63510E+00 |
| A4 | 1.59810E−03 |
| A6 | −3.46710E−03 |
| A8 | −4.06710E−04 |
| | 4th surface |
| K | −3.00000E+01 |
| A4 | −6.27490E−02 |
| A6 | 2.90730E−02 |
| A8 | −1.48820E−03 |
| | 5th surface |
| K | −1.95880E+00 |
| A4 | −4.40380E−02 |
| A6 | 3.80200E−02 |
| A8 | −8.31510E−03 |
| A10 | 1.04370E−03 |
| | 6th surface |
| K | 5.71140E+00 |
| A4 | 1.47140E−02 |
| A6 | 6.85170E−04 |
| A8 | 9.57870E−03 |
| A10 | −1.70640E−03 |
| | 7th surface |
| K | −3.33630E+00 |
| A4 | −4.96880E−02 |
| A6 | 2.16080E−02 |
| A8 | −4.96410E−03 |
| A10 | 1.74530E−03 |
| A12 | −1.64120E−04 |
| | 8th surface |
| K | 1.58720E+01 |
| A4 | −4.64690E−02 |
| A6 | 1.60930E−02 |
| A8 | −7.55040E−04 |
| A10 | −5.57240E−04 |
| A12 | 9.71860E−05 |
| | 9th surface |
| K | −8.24730E+00 |
| A4 | −5.03120E−02 |
| A6 | 1.35490E−02 |
| A8 | −2.53450E−03 |
| A10 | 2.45300E−04 |
| A12 | −1.05640E−05 |

Table 24 shows lens data of each lens in the image pickup lens.

TABLE 24

| Lens | Forefront surface | Focal length (mm) |
|---|---|---|
| 1 | 2 | 2.835 |
| 2 | 4 | -3.931 |
| 3 | 6 | 2.443 |
| 4 | 8 | -2.285 |

Figure 19:
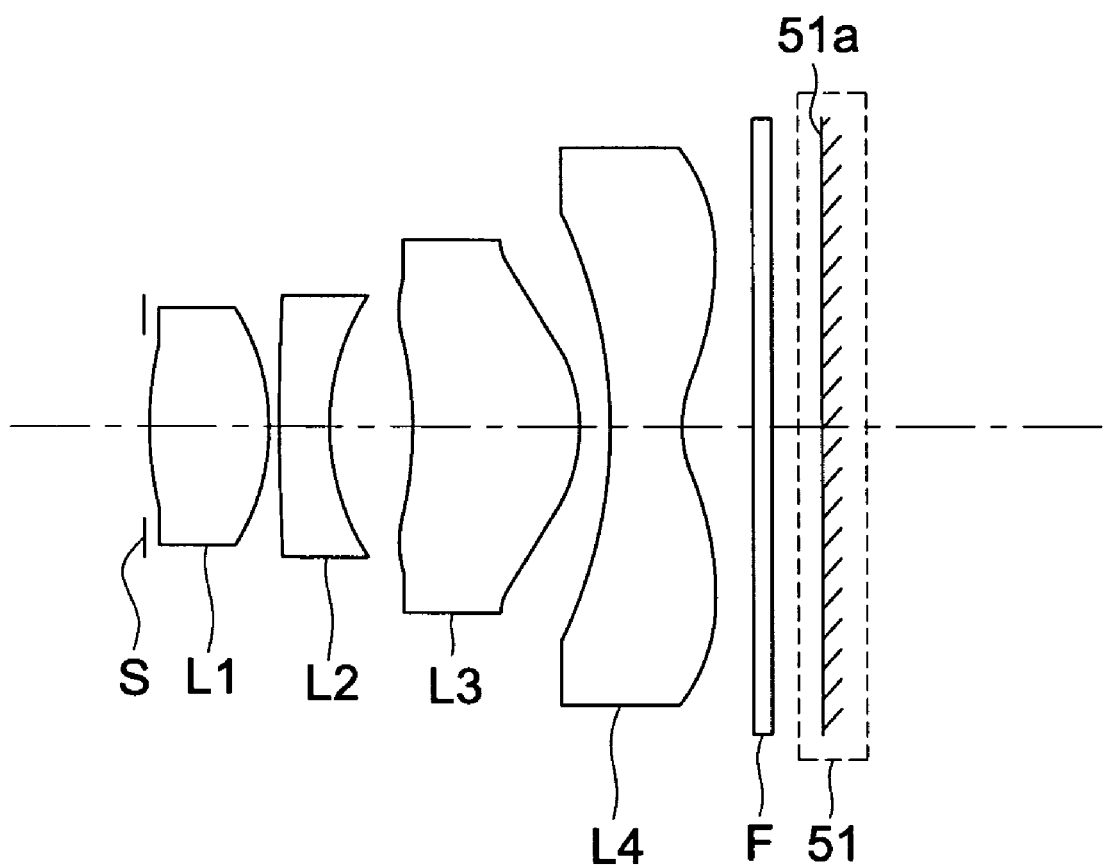
FIG. 19 is a cross section diagram of a lens in Example 8.

FIG. 19 is a cross-sectional view of a lens in Example 8. L1 represents the first lens, L2 represents the second lens, L3 represents the third lens, L4 represents the fourth lens and S represents an aperture stop. F represents a parallel flat plate such as an optical low-pass filter, an infrared-ray cut filter and a seal glass of a solid-state image pickup element.

Figure 20:
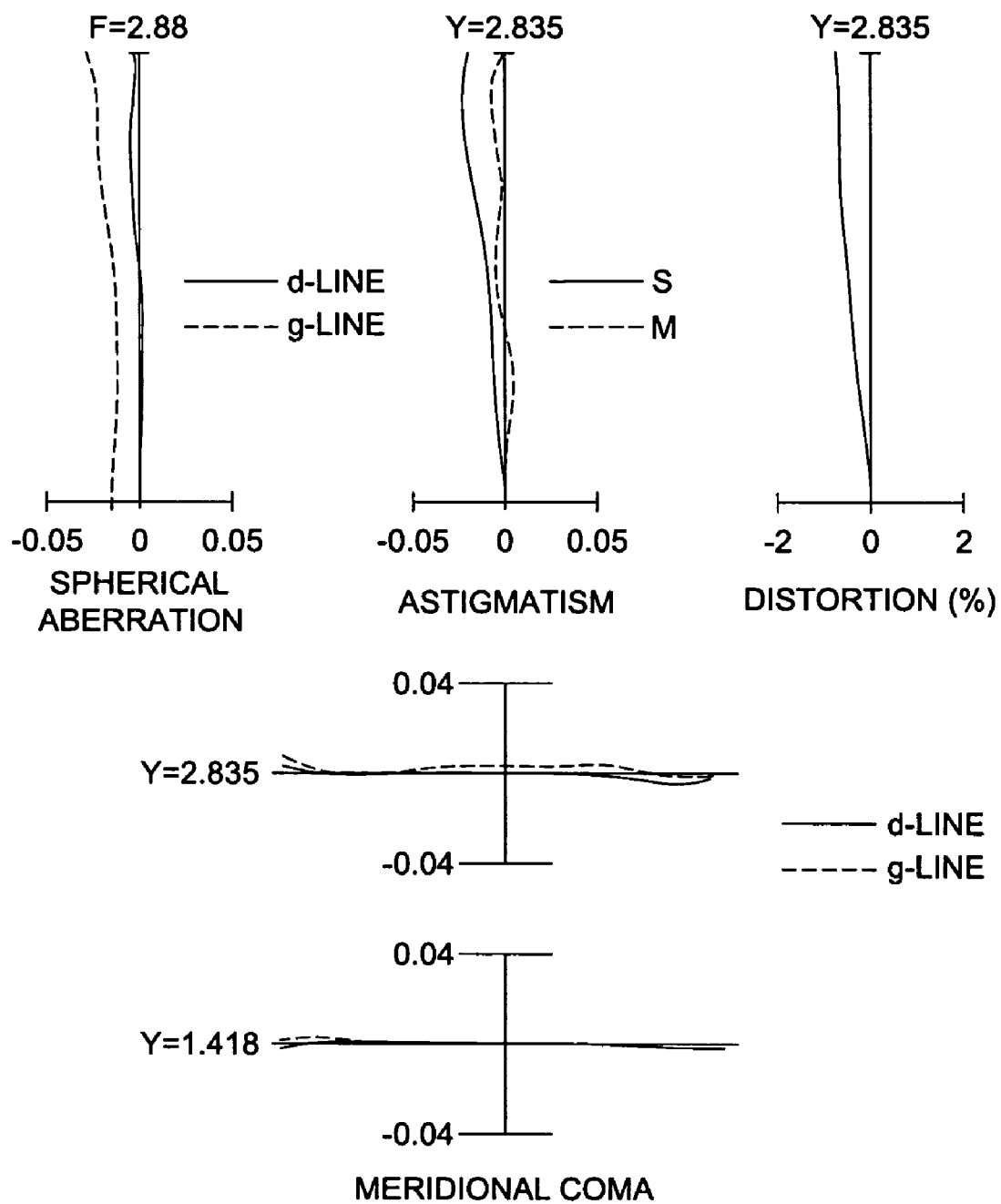
FIG. 20 is an aberration diagram of a lens in the Example 8.

FIG. 20 shows diagrams of aberrations (spherical aberration, astigmatism, distortion and meridional coma) for the lens in Example 8.

In the present example, each of the first lens, the third lens and the fourth lens is made of a polyolefin-based plastic material whose saturated water absorption is 0.01%.

The second lens is made of a polyester-based plastic material whose saturated water absorption is 0.7%. Compared with a glass lens, a plastic lens has greater saturated water absorption, and therefore, when humidity is changed suddenly, uneven distribution in water-absorption values is generated transiently, and a refractive index of the plastic lens fails to be uniform, thus, excellent image forming capability tends not to be obtained. For controlling deterioration of capability caused by changes in humidity, it is preferable to use plastic materials all of which have saturated water absorption of 0.7% or less.

Example 9

Table 25 shows lens data.

TABLE 25 f = 5.21 mm, fB = 0.92 mm, F = 2.88, ω = 34.4°, 2Y = 7.13 mm,
ENTP = 0.00 mm, EXTP = -3.12 mm, H1 = -1.51 mm, H2 = -4.29 mm

| Surface No. | R (mm) | D (mm) | $N_d$ | $v_d$ | Effective radius (mm) |
|---|---|---|---|---|---|
| 1 (Aperture stop) | ∞ | 0.00 | | | 0.90 |
| 2* | 2.994 | 1.29 | 1.58913 | 61.2 | 0.97 |
| 3* | -1.984 | 0.07 | | | 1.17 |
| 4* | -4.182 | 0.50 | 1.68893 | 31.2 | 1.17 |
| 5* | 3.676 | 0.65 | | | 1.20 |
| 6* | -3.384 | 1.25 | 1.53180 | 56.0 | 1.27 |
| 7* | -1.235 | 0.25 | | | 1.76 |
| 8* | -10.853 | 0.78 | 1.53180 | 56.0 | 2.34 |
| 9* | 1.635 | 0.60 | | | 2.87 |
| 10 | ∞ | 0.10 | 1.51633 | 64.1 | 3.17 |
| 11 | ∞ | | | | 3.20 |

Table 26 shows aspheric surface coefficients.

TABLE 26

| 2nd surface | |
|---|---|
| K | -1.76180E+00 |
| A4 | -1.40020E-02 |
| A6 | -3.48910E-03 |
| A8 | -1.74090E-02 |

TABLE 26-continued

| 3rd surface | |
|---|---|
| K | 7.03990E-01 |
| A4 | 1.66530E-02 |
| A6 | -3.03790E-03 |
| A8 | 8.21450E-04 |
| 4th surface | |
| K | -6.38900E+00 |
| A4 | -3.73500E-02 |
| A6 | 1.95810E-02 |
| A8 | 3.81070E-03 |
| 5th surface | |
| K | -3.19970E+00 |
| A4 | -2.16050E-02 |
| A6 | 2.01530E-02 |
| A8 | -7.96270E-03 |
| A10 | 2.50580E-03 |
| 6th surface | |
| K | 5.03460E+00 |
| A4 | 8.93490E-03 |
| A6 | -1.27740E-03 |
| A8 | 4.26540E-03 |
| A10 | -2.32240E-03 |
| 7th surface | |
| K | -3.10600E+00 |
| A4 | -3.00420E-02 |
| A6 | 8.22990E-03 |
| A8 | -2.79430E-04 |
| A10 | 4.21130E-04 |
| A12 | -5.65490E-05 |
| 8th surface | |
| K | 8.56280E+00 |
| A4 | -2.50400E-02 |
| A6 | 5.04530E-03 |
| A8 | 6.19290E-05 |
| A10 | -6.08880E-05 |
| A12 | 3.36560E-06 |
| 9th surface | |
| K | -8.96200E+00 |
| A4 | -2.82080E-02 |
| A6 | 4.28760E-03 |
| A8 | -5.40840E-04 |
| A10 | 3.48450E-05 |
| A12 | -8.59700E-07 |

Table 27 shows lens data of each lens in the image pickup lens.

TABLE 27

| Lens | Forefront surface | Focal length (mm) |
|---|---|---|
| 1 | 2 | 2.241 |
| 2 | 4 | -2.768 |
| 3 | 6 | 3.041 |
| 4 | 8 | -2.615 |

Figure 21:
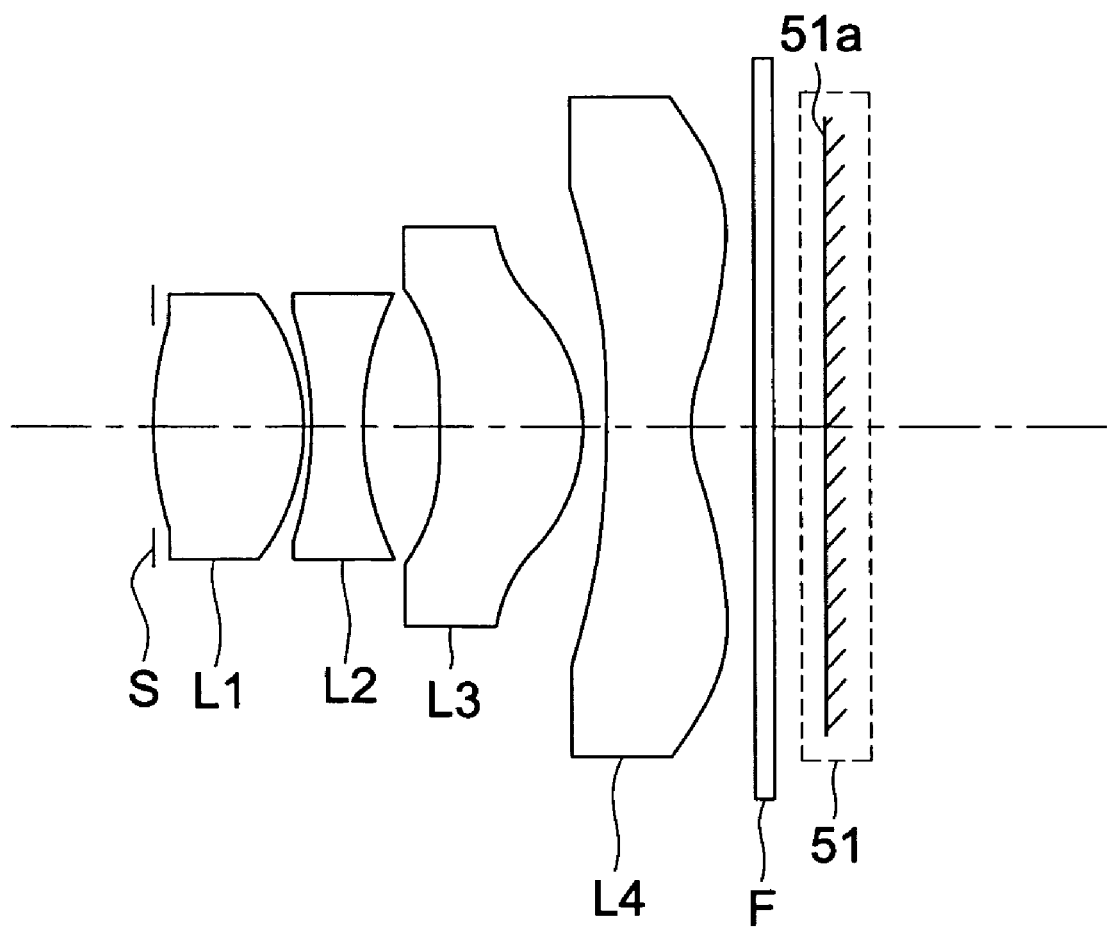
FIG. 21 is s cross section diagram of a lens in Example 9.

FIG. 21 is a cross-sectional view of a lens in Example 9. L1 represents the first lens, L2 represents the second lens, L3 represents the third lens, L4 represents the fourth lens and S represents an aperture stop. F represents a parallel flat plate such as an optical low-pass filter, an infrared-ray cut filter and a seal glass of a solid-state image pickup element.

Figure 22:
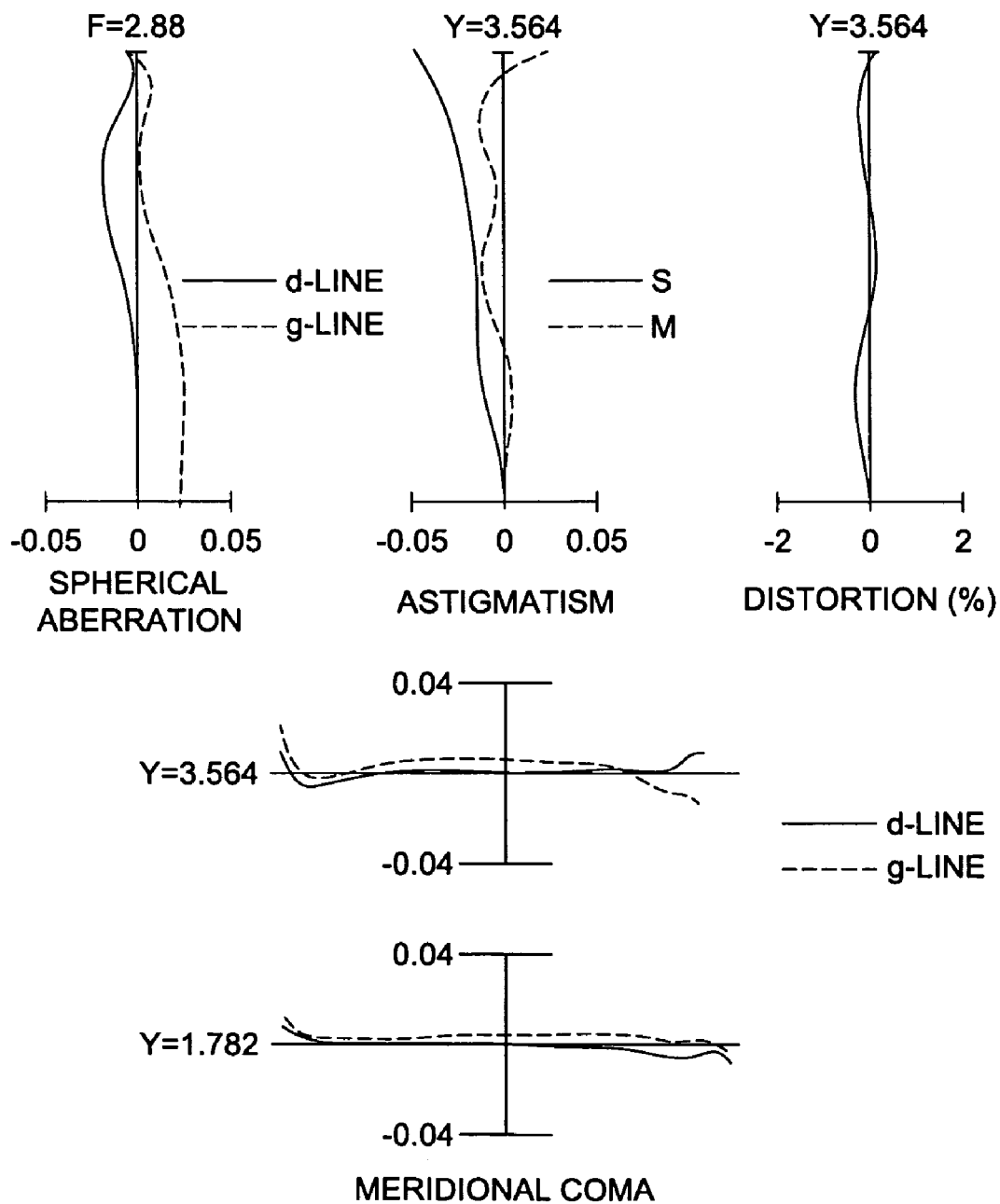
FIG. 22 is an aberration diagram of a lens in the Example 9.

FIG. 22 shows diagrams of aberrations (spherical aberration, astigmatism, distortion and meridional coma) for the lens in Example 8.

In the present example, each of the first lens and the second lens is a glass mold lens. Each of the third lens and the fourth lens is made of a polyolefin-based plastic material whose saturated water absorption is 0.01% or less.

Compared with a glass lens, a plastic lens has greater saturated water absorption, and therefore, when humidity is changed suddenly, uneven distribution in water-absorption values is generated transiently, and a refractive index of the plastic lens fails to be uniform, thus, excellent image forming capability tends not to be obtained. For controlling deterioration of capability caused by changes in humidity, it is preferable to use plastic materials all of which have saturated water absorption of 0.7% or less.

Example 10

Table 28 shows lens data.

TABLE 28 f = 3.87 mm, fB = 0.51 mm, F = 2.88, ω = 30.5°, 2Y = 4.48 mm,
ENTP = 0.00 mm, EXTP = −2.46 mm, H1 = −1.17 mm, H2 = −3.36 mm

| Surface No. | R (mm) | D (mm) | $N_d$ | $v_d$ | Effective radius (mm) |
|---|---|---|---|---|---|
| 1 (Aperture stop) | ∞ | 0.05 | | | 0.67 |
| 2* | 2.844 | 0.73 | 1.53180 | 56.0 | 0.71 |
| 3* | −3.673 | 0.21 | | | 0.82 |
| 4* | 6.996 | 0.45 | 1.58300 | 30.0 | 0.88 |
| 5* | 1.676 | 0.38 | | | 0.95 |
| 6* | 645.499 | 0.94 | 1.53180 | 56.0 | 1.13 |
| 7* | −1.527 | 0.68 | | | 1.27 |
| 8* | −53.467 | 0.51 | 1.53180 | 56.0 | 1.60 |
| 9* | 1.654 | 0.40 | | | 2.00 |
| 10 | ∞ | 0.10 | 1.51630 | 64.1 | 2.19 |
| 11 | ∞ | 0.51 | | | 2.22 |

Table 29 shows aspheric surface coefficients.

TABLE 29

| 2$^{nd}$ surface | |
|---|---|
| K | −1.55924E+00 |
| A4 | −2.08976E−02 |
| A6 | −6.68657E−03 |
| A8 | −1.59126E−02 |
| 3$^{rd}$ surface | |
| K | −7.39959E+00 |
| A4 | −3.67768E−02 |
| A6 | 2.65599E−02 |
| A8 | −3.03052E−02 |
| 4$^{th}$ surface | |
| K | 1.73200E+01 |
| A4 | −8.86250E−02 |
| A6 | 7.14097E−02 |
| A8 | −2.32201E−02 |
| 5$^{th}$ surface | |
| K | −1.67439E+00 |
| A4 | −5.81163E−02 |
| A6 | 4.31558E−02 |
| A8 | −6.87337E−03 |
| A10 | −1.63073E−03 |
| 6$^{th}$ surface | |
| K | 3.00000E+01 |
| A4 | 2.16515E−02 |
| A6 | 3.36649E−03 |
| A8 | 1.83147E−02 |
| A10 | −5.45106E−03 |

TABLE 29-continued

| 7$^{th}$ surface | |
|---|---|
| K | −4.30385E+00 |
| A4 | −7.12375E−02 |
| A6 | 4.15501E−02 |
| A8 | −1.55104E−03 |
| A10 | 5.50078E−03 |
| A12 | −2.58759E−04 |
| 8$^{th}$ surface | |
| K | 3.00000E+01 |
| A4 | −1.66900E−01 |
| A6 | 5.75819E−02 |
| A8 | 4.08086E−04 |
| A10 | −4.29096E−03 |
| A12 | 7.17894E−04 |
| 9$^{th}$ surface | |
| K | −7.43804E+00 |
| A4 | −9.50717E−02 |
| A6 | 2.57742E−02 |
| A8 | −5.09659E−03 |
| A10 | 6.73320E−04 |
| A12 | −5.84000E−05 |

Table 30 shows lens data of each lens in the image pickup lens.

TABLE 30

| Lens | Forefront surface | Focal length (mm) |
|---|---|---|
| 1 | 2 | 3.136 |
| 2 | 4 | −3.902 |
| 3 | 6 | 2.865 |
| 4 | 8 | −3.007 |

Figure 23:
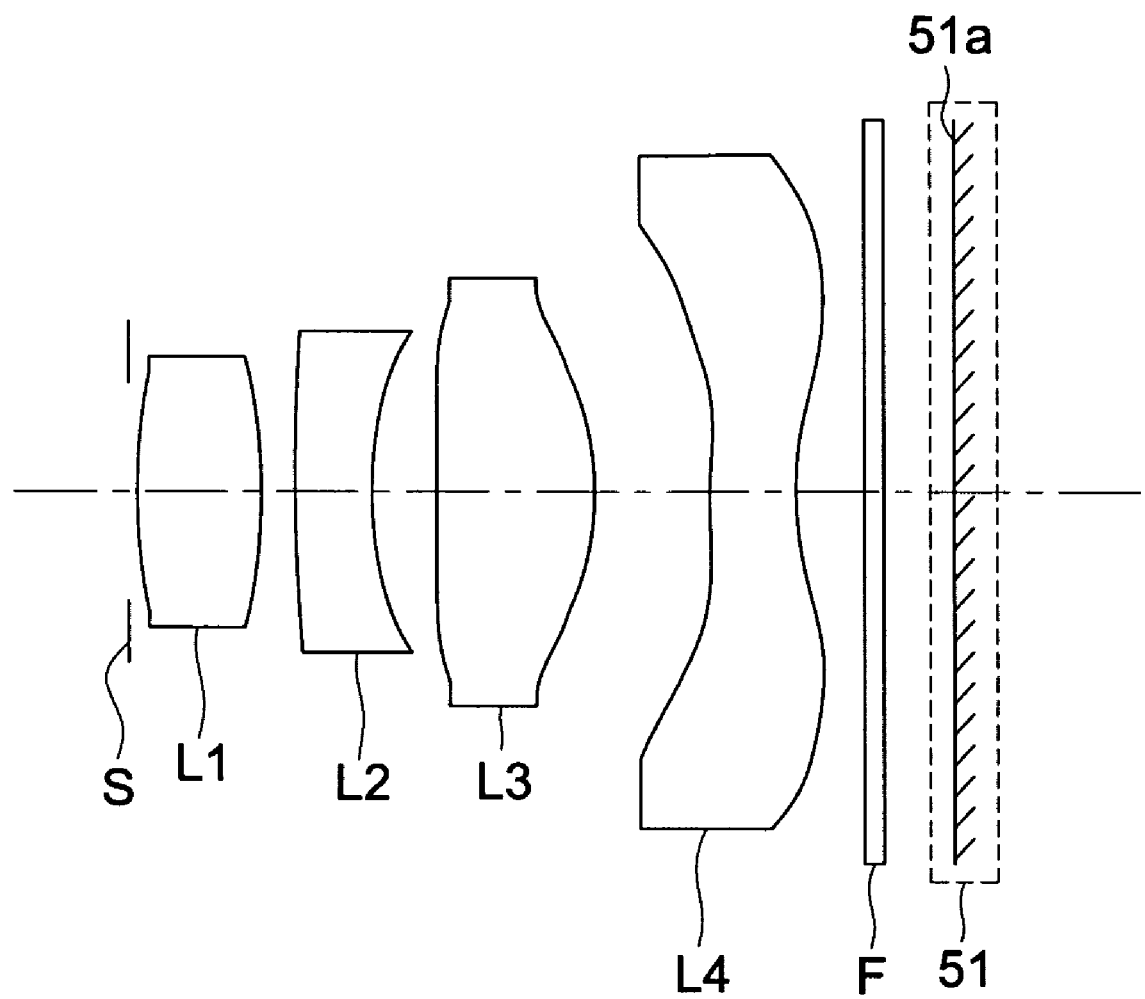
FIG. 23 is s cross section diagram of a lens in Example 10.

FIG. 23 is a cross-sectional view of a lens in Example 10. L1 represents the first lens, L2 represents the second lens, L3 represents the third lens, L4 represents the fourth lens and S represents an aperture stop. F represents a parallel flat plate such as an optical low-pass filter, an infrared-ray cut filter and a seal glass of a solid-state image pickup element.

Figure 24:
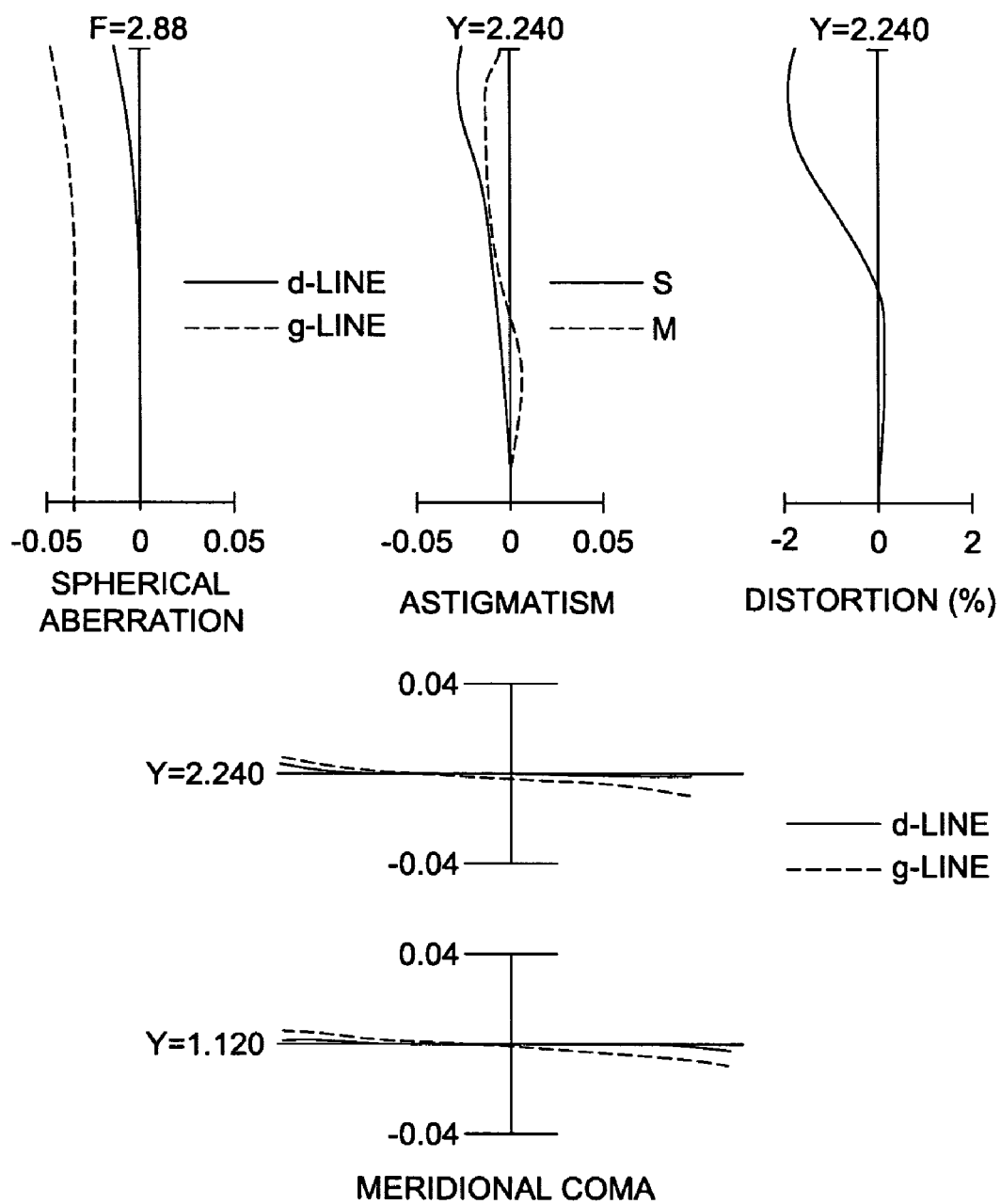
FIG. 24 is an aberration diagram of a lens in the Example 10.

FIG. 24 shows diagrams of aberrations (spherical aberration, astigmatism, distortion and meridional coma) for the lens in Example 10.

In the present example, each of the first lens, the third lens and the fourth lens is made of a polyolefin-based plastic material whose saturated water absorption is 0.01% or less. The second lens is made of a polycarbonate-based plastic material whose saturated water absorption is 0.4%. Compared with a glass lens, a plastic lens has greater saturated water absorption, and therefore, when humidity is changed suddenly, uneven distribution in water-absorption values is generated transiently, and a refractive index of the plastic lens fails to be uniform, thus, excellent image forming capability tends not to be obtained. For controlling deterioration of capability caused by changes in humidity, it is preferable to use plastic materials all of which have saturated water absorption of 0.7% or less.

Example 11

Table 31 shows lens data.

TABLE 31 f = 3.99 mm, fB = 0.64 mm, F = 2.88, ω = 29.8°, 2Y = 4.48 mm,
ENTP = 0.00 mm, EXTP = −2.25 mm, H1 = −1.50 mm, H2 = −3.34 mm

| Surface No. | R (mm) | D (mm) | $N_d$ | $v_d$ | Effective radius (mm) |
|---|---|---|---|---|---|
| 1 (Aperture stop) | ∞ | 0.05 | | | 0.69 |
| 2* | 4.437 | 0.91 | 1.53180 | 56.0 | 0.70 |
| 3* | −1.692 | 0.10 | | | 0.88 |
| 4* | 3.332 | 0.40 | 1.60700 | 27.0 | 0.94 |
| 5* | 1.402 | 0.76 | | | 0.90 |
| 6* | −1.893 | 0.78 | 1.53180 | 56.0 | 1.09 |
| 7* | −0.824 | 0.23 | | | 1.30 |
| 8* | −9.459 | 0.50 | 1.53180 | 56.0 | 1.60 |
| 9* | 1.002 | 0.40 | | | 1.96 |
| 10 | ∞ | 0.10 | 1.51630 | 64.1 | 2.14 |
| 11 | ∞ | 0.64 | | | 2.17 |

Table 32 shows aspheric surface coefficients.

TABLE 32

| $2^{nd}$ surface | |
|---|---|
| K | 3.06963E+00 |
| A4 | −9.09842E−02 |
| A6 | −4.26341E−02 |
| A8 | −2.68432E−02 |
| $3^{rd}$ surface | |
| K | 2.95776E−01 |
| A4 | −3.40268E−03 |
| A6 | 1.56994E−02 |
| A8 | −2.96831E−02 |
| $4^{th}$ surface | |
| K | 1.69798E+00 |
| A4 | −5.15699E−02 |
| A6 | 1.03182E−01 |
| A8 | −3.84753E−02 |
| $5^{th}$ surface | |
| K | −1.04310E+00 |
| A4 | −4.20513E−02 |
| A6 | 6.30603E−02 |
| A8 | 4.04641E−02 |
| A10 | −3.51919E−02 |
| $6^{th}$ surface | |
| K | −6.65112E+00 |
| A4 | −3.67947E−03 |
| A6 | 1.85963E−02 |
| A8 | 1.83005E−02 |
| A10 | −6.75120E−03 |
| $7^{th}$ surface | |
| K | −3.43373E+00 |
| A4 | −5.05171E−02 |
| A6 | 6.73357E−02 |
| A8 | −1.29721E−02 |
| A10 | 2.40539E−03 |
| A12 | −6.08799E−04 |
| $8^{th}$ surface | |
| K | 2.85728E+01 |
| A4 | −3.92915E−02 |
| A6 | 1.43897E−02 |
| A8 | 4.16282E−03 |
| A10 | −5.21667E−03 |
| A12 | 1.17660E−03 |

TABLE 32-continued

| $9^{th}$ surface | |
|---|---|
| K | −9.71560E+00 |
| A4 | −9.80937E−02 |
| A6 | 4.07515E−02 |
| A8 | −1.18892E−02 |
| A10 | 1.57302E−03 |
| A12 | −8.89190E−05 |

Table 33 shows lens data of each lens in the image pickup lens.

TABLE 33

| Lens | Forefront surface | Focal length (mm) |
|---|---|---|
| 1 | 2 | 2.429 |
| 2 | 4 | −4.326 |
| 3 | 6 | 2.190 |
| 4 | 8 | −1.677 |

Figure 25:
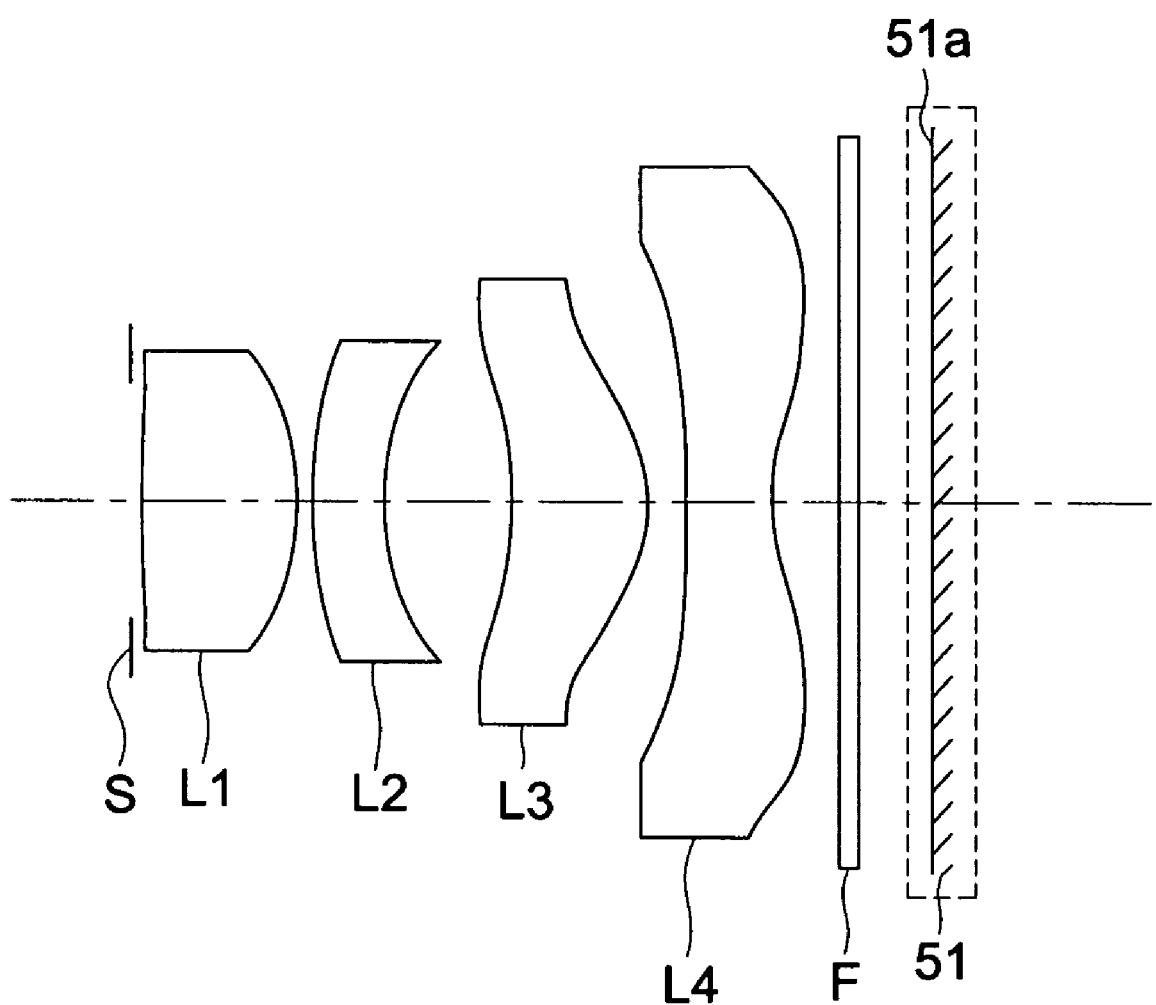
FIG. 25 is s cross section diagram of a lens in Example 11.

FIG. 25 is a cross-sectional view of a lens in Example 11. L1 represents the first lens, L2 represents the second lens, L3 represents the third lens, L4 represents the fourth lens and S represents an aperture stop. F represents a parallel flat plate such as an optical low-pass filter, an infrared-ray cut filter and a seal glass of a solid-state image pickup element.

Figure 26:
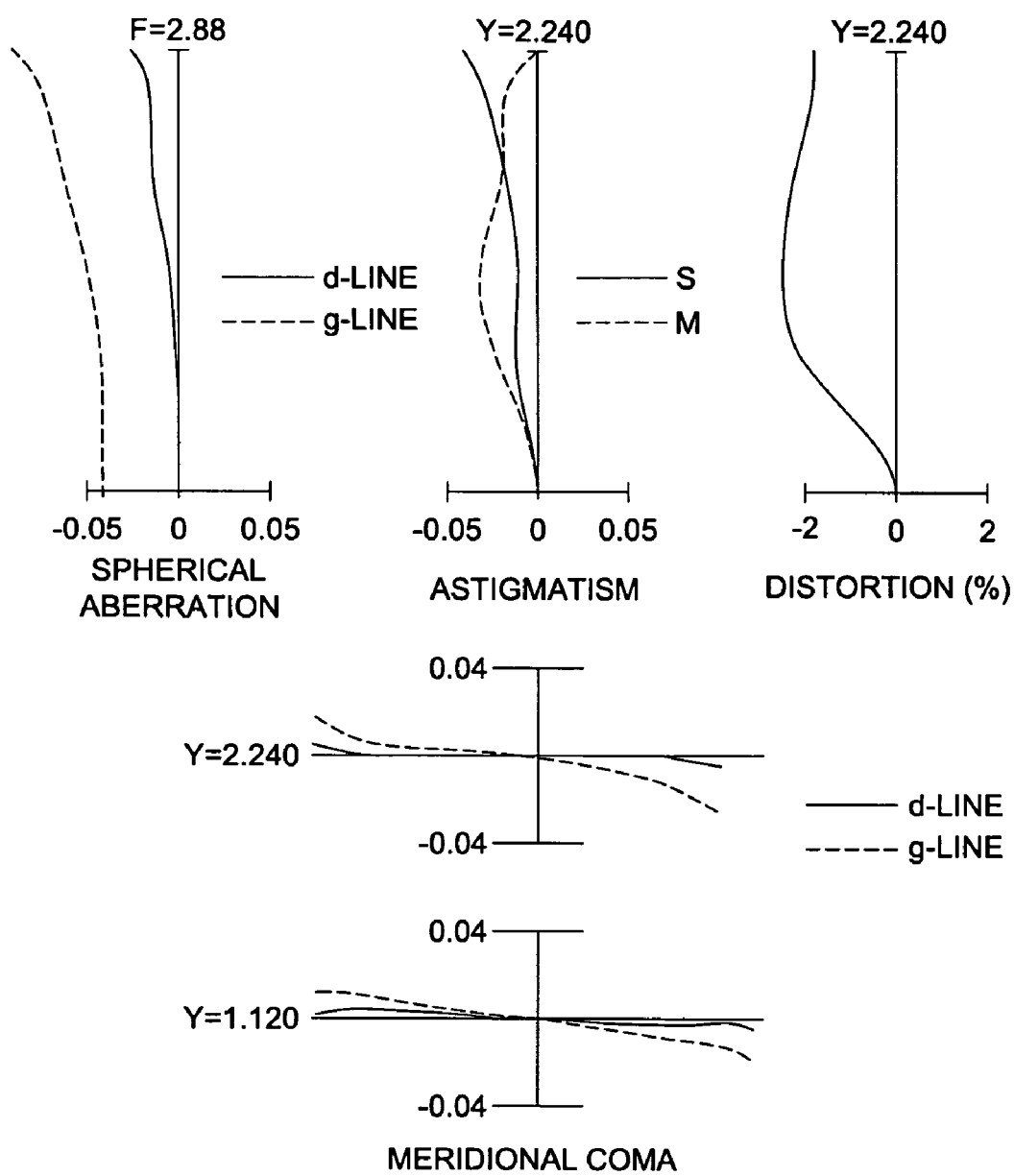
FIG. 26 is an aberration diagram of a lens in the Example 11.

FIG. 26 shows diagrams of aberrations (spherical aberration, astigmatism, distortion and meridional coma) for the lens in Example 11.

In the present example, each of the first lens, the third lens and the fourth lens is made of a polyolefin-based plastic material whose saturated water absorption is 0.01% or less. The second lens is made of a polyester-based plastic material whose saturated water absorption is 0.7%. Compared with a glass lens, a plastic lens has greater saturated water absorption, and therefore, when humidity is changed suddenly, uneven distribution in water-absorption values is generated transiently, and a refractive index of the plastic lens fails to be uniform, thus, excellent image forming capability tends not to be obtained. For controlling deterioration of capability caused by changes in humidity, it is preferable to use plastic materials all of which have saturated water absorption of 0.7% or less.

Example 12

Table 34 shows lens data.

TABLE 34 f = 4.00 mm, fB = 0.52 mm, F = 2.88, ω = 29.8°, 2Y = 4.48 mm,
ENTP = 0.00 mm, EXTP = −2.32 mm, H1 = −1.61 mm, H2 = −3.47 mm

| Surface No. | R (mm) | D (mm) | $N_d$ | $v_d$ | Effective radius (mm) |
|---|---|---|---|---|---|
| 1 (Aperture stop) | ∞ | 0.05 | | | 0.69 |
| 2* | 1.871 | 0.80 | 1.53180 | 56.0 | 0.77 |
| 3* | −2.598 | 0.05 | | | 0.86 |
| 4* | 1439.436 | 0.40 | 1.58300 | 30.0 | 0.87 |
| 5* | 1.565 | 0.50 | | | 0.90 |
| 6* | −9.869 | 0.80 | 1.53180 | 56.0 | 1.07 |
| 7* | −1.685 | 0.37 | | | 1.25 |
| 8* | −57.384 | 0.77 | 1.53180 | 56.0 | 1.45 |
| 9* | 1.775 | 0.40 | | | 1.96 |
| 10 | ∞ | 0.10 | 1.51630 | 64.1 | 2.20 |
| 11 | ∞ | 0.52 | | | 2.22 |

Table 35 shows aspheric surface coefficients.

TABLE 35

| | 2nd surface |
|---|---|
| K | −2.16222E−01 |
| A4 | −1.76276E−02 |
| A6 | −1.13146E−02 |
| A8 | −2.78349E−02 |
| | 3rd surface |
| K | 4.42710E+00 |
| A4 | 1.20064E−01 |
| A6 | −9.62069E−02 |
| A8 | 3.44467E−02 |
| | 4th surface |
| K | −3.00000E+01 |
| A4 | −1.39393E−02 |
| A6 | 2.06359E−02 |
| A8 | −1.20054E−02 |
| | 5th surface |
| K | −3.86511E+00 |
| A4 | 4.10207E−03 |
| A6 | 1.01326E−01 |
| A8 | −4.00175E−02 |
| A10 | 3.38549E−03 |
| | 6th surface |
| K | 1.14200E+01 |
| A4 | −4.01998E−03 |
| A6 | −3.94345E−02 |
| A8 | 9.48913E−02 |
| A10 | −3.52751E−02 |
| | 7th surface |
| K | −2.53652E+00 |
| A4 | −8.44568E−02 |
| A6 | 4.89645E−02 |
| A8 | −1.66288E−02 |
| A10 | 3.04939E−02 |
| A12 | −1.02838E−02 |
| | 8th surface |
| K | 3.00000E+01 |
| A4 | −2.70325E−01 |
| A6 | 1.36067E−01 |
| A8 | −1.60495E−02 |
| A10 | −1.00760E−02 |
| A12 | 2.93549E−03 |
| | 9th surface |
| K | −9.13345E+00 |
| A4 | −1.16656E−01 |
| A6 | 4.27449E−02 |
| A8 | −1.18055E−02 |

TABLE 35-continued

| A10 | 1.69996E−03 |
|---|---|
| A12 | −1.13271E−04 |

Table 36 shows lens data of each lens in the image pickup lens.

TABLE 36

| Lens | Forefront surface | Focal length (mm) |
|---|---|---|
| 1 | 2 | 2.181 |
| 2 | 4 | −2.688 |
| 3 | 6 | 3.695 |
| 4 | 8 | −3.223 |

Figure 27:
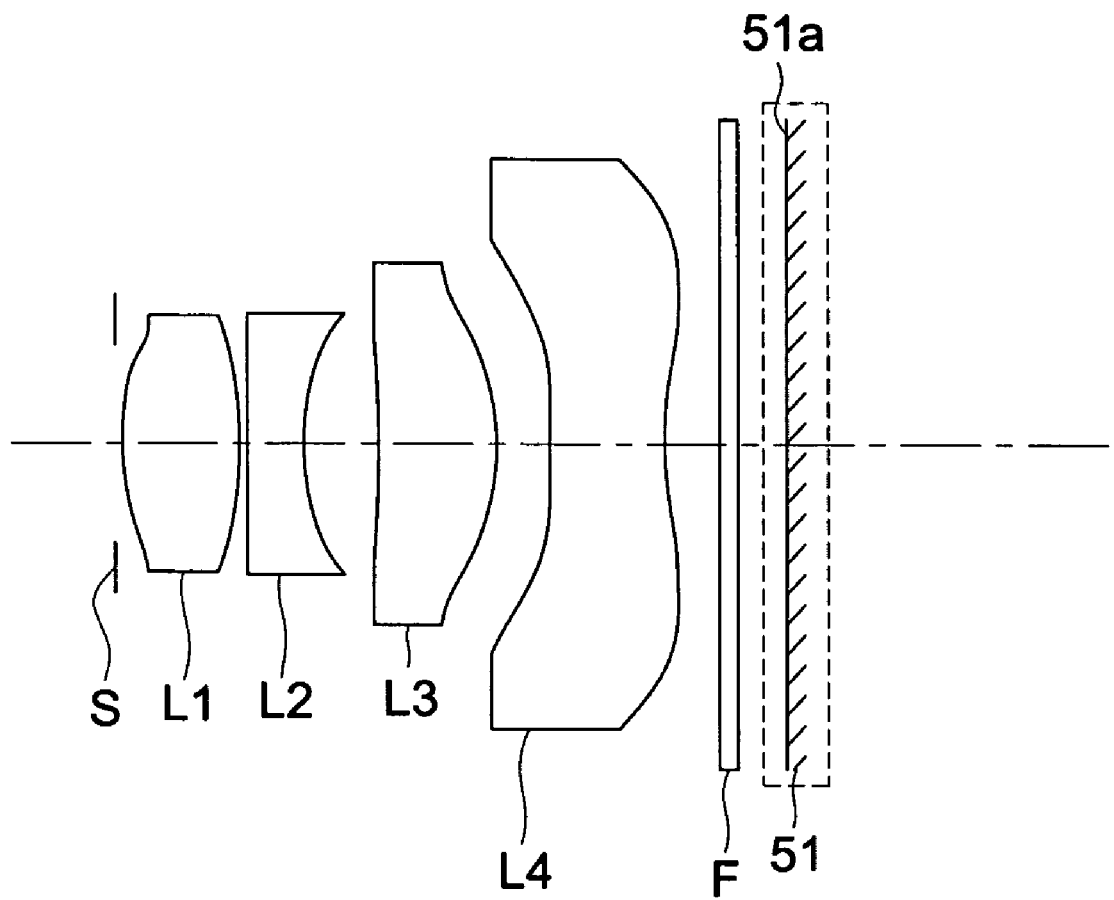
FIG. 27 is s cross section diagram of a lens in Example 12.

FIG. 27 is a cross-sectional view of a lens in Example 12. L1 represents the first lens, L2 represents the second lens, L3 represents the third lens, L4 represents the fourth lens and S represents an aperture stop. F represents a parallel flat plate such as an optical low-pass filter, an infrared-ray cut filter and a seal glass of a solid-state image pickup element.

Figure 28:
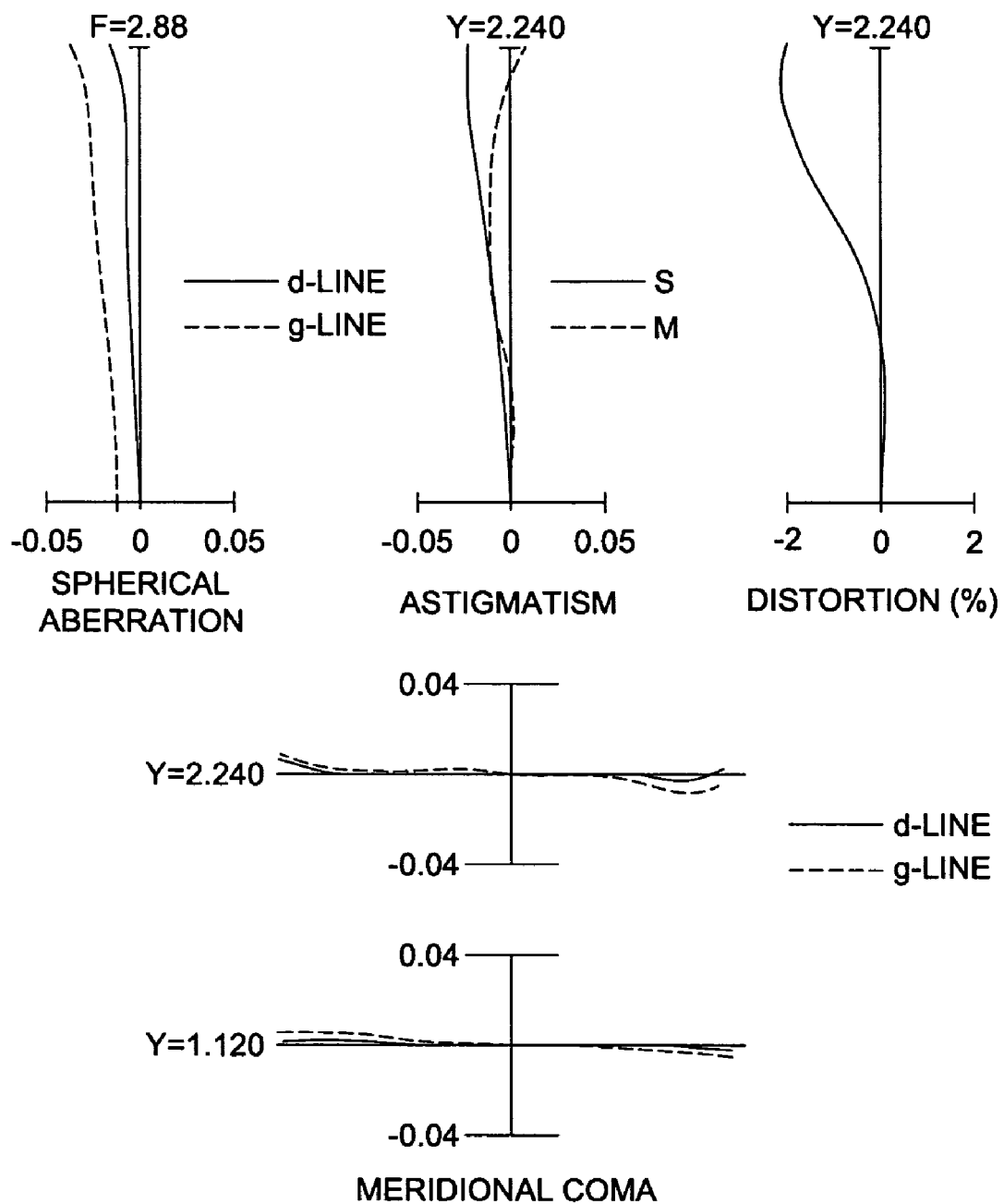
FIG. 28 is an aberration diagram of a lens in the Example 12.

FIG. 28 shows diagrams of aberrations (spherical aberration, astigmatism, distortion and meridional coma) for the lens in Example 11.

In the present example, each of the first lens, the third lens and the fourth lens is made of a polyolefin-based plastic material whose saturated water absorption is 0.01% or less. The second lens is made of a polycarbonate-based plastic material whose saturated water absorption is 0.4%. Compared with a glass lens, a plastic lens has greater saturated water absorption, and therefore, when humidity is changed suddenly, uneven distribution in water-absorption values is generated transiently, and a refractive index of the plastic lens fails to be uniform, thus, excellent image forming capability tends not to be obtained. For controlling deterioration of capability caused by changes in humidity, it is preferable to use plastic materials all of which have saturated water absorption of 0.7% or less.

Table 37 shows values of respective Examples corresponding to respective conditional expressions (1)-(10) next.

TABLE 37

| | Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| (1) f1/f | 0.63 | 0.72 | 0.59 | 0.61 | 0.57 | 0.68 | 0.65 | 0.60 | 0.43 | 0.81 | 0.61 | 0.55 |
| (2) f3/f | 0.53 | 0.41 | 0.51 | 0.83 | 0.55 | 0.56 | 0.60 | 0.52 | 0.58 | 0.74 | 0.55 | 0.93 |
| (3) Pair/P | −1.37 | −0.97 | −1.53 | −2.02 | −1.77 | −2.03 | −2.70 | −2.24 | −1.90 | −1.34 | −3.21 | −1.74 |
| (5) f4/f | −0.52 | −0.35 | −0.50 | −0.77 | −0.51 | −0.46 | −0.46 | −0.48 | −0.50 | −0.78 | −0.42 | −0.81 |
| (6) (r7 + r8)/(r7 − r8) | 0.53 | 0.28 | 0.79 | 0.67 | 0.62 | 0.76 | 0.54 | 0.71 | 0.74 | 0.94 | 0.81 | 0.94 |
| (7) PH8/H | 0.60 | 0.71 | 0.72 | 0.63 | 0.65 | 0.55 | 0.45 | 0.66 | 0.57 | 0.56 | 0.60 | 0.52 |
| (8) ν1 − ν2 | 26.0 | 31.2 | 26.0 | 29.0 | 26.0 | 43.2 | 44.8 | 29.0 | 30.0 | 26.0 | 29.0 | 26.0 |
| (9) n2 | 1.58 | 1.58 | 1.58 | 1.61 | 1.58 | 1.61 | 1.81 | 1.61 | 1.69 | 1.58 | 1.61 | 1.58 |
| (10) L/f | 1.27 | 1.26 | 1.36 | 1.29 | 1.30 | 1.12 | 1.08 | 1.29 | 1.22 | 1.27 | 1.21 | 1.18 |

When all lenses including the first lens up to the fourth lens are plastic lenses as in the Examples 1, 3, 5 and 8, an image point position of the total system of the image pickup lens can be fluctuated due to change of the ambient temperature, since a refractive index of a plastic lens is changed greatly due to temperature change. When the image pickup lens is utilized in an image pickup unit having specifications wherein this fluctuation of image point position cannot be ignored, this property doe to temperature change can be lightened by the following structure. For example, there is provided the positive first lens made of glass material such as that in Example 6, (for example, a glass mold lens), and further provided the second lens, the third lens and the fourth lens as a plastic lens. Then, refractive power is distributed to the second lens, the third lens and the fourth lens so that the distribution cancels, to a certain extent, the fluctuations of image point position caused by temperature changes. When molded glass lens is employed, it is preferable to use a glass material with 400° C. or less of a glass transition temperature (Tg).

Further, it has been found recently that changes of property of a plastic material due to temperature change can be reduced by mixing inorganic microparticles in the plastic material. In detailed explanation, when microparticles are mixed in a transparent plastic material, light generally scatters in the material, and transmittance is lowered, which has made it to hardly use the plastic material as an optical material. However, it is possible to restrain substantial generation of scattering by making a size of microparticles to be smaller than a wavelength of a transmitted light flux. While the refractive index of plastic material decreases when temperature rises, the refractive index of inorganic microparticles increases when temperature rises. It is therefore possible to control refractive index changes so that they may hardly be caused, by utilizing the aforesaid temperature dependence properties so that they may act to offset each other. To be concrete, when inorganic microparticles each being 20 nanometers in terms of maximum size are dispersed in a plastic material representing a base material, temperature dependence properties of the plastic material for refractive index are extremely low. For example, by dispersing microparticles of niobium oxide ($Nb_2O_5$) in acrylic, refractive index changes caused by temperature changes can be made small. In the present embodiments, it is possible to control fluctuations of image point position for the total system of an image pickup lens in the case of temperature changes to be small, by using plastic materials in which the inorganic microparticles are dispersed, for one of two positive lenses (L1 and L3) or for all lenses (L1-L4).

Meanwhile, with respect to an incident angle of a principal ray of a light flux entering an image pickup plane of a solid-state image pickup element, the present Examples are not always designed so as to make the incident angle of a principal ray sufficiently small on the peripheral portion of the image pickup plane. In the recent technology, however, shading can be lightened by reviewing arrangement of a color filter of a solid-state image pickup element and of an on-chip micro-lens array. Specifically, when the arrangement of a color filter of a solid-state image pickup element and of an on-chip micro-lens array is set to be slightly smaller compared with a pixel pitch of an image pickup surface of image pickup element, the color filter and the on-chip micro-lens array arranged closer to periphery of the image pickup surface are shifted gradually larger to the optical axis side of the image pickup lens compared with respective pixel. Thereby, a light flux obliquely entering the image pickup surface can be guided to a light-receiving portion of each pixel efficiently. Owing to this, shading generated on a solid-state image pickup element can be controlled to be small. The present Examples are designed to achieve furthermore downsizing of the image pickup lens by taking the advantage of the lighten requirement.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image pickup lens for forming an image of an object on a photoelectrical converter of a solid-state image pickup element, the image pickup lens comprising, in order from an object side thereof:

an aperture stop;

a first lens having a positive refractive power;

a second lens having a negative refractive power;

a third lens having a positive refractive power; and a fourth lens having a negative refractive power and a biconcave shape and comprising a surface in an aspheric shape, wherein the image pickup lens satisfies following expressions:

$$30 < f1/f < 0.85,$$

$$0.35 < f3/f < 0.95, \text{ and}$$

$$0.28 \leq (r7+r8)/(r7-r8) \leq 0.94,$$

where f1 is a focal length of the first lens, f3 is a focal length of the third lens, f is a focal length of the total system of the image pickup lens, r7 is a curvature radius of a surface of the fourth lens facing the object side, and r8 is a curvature radius of a surface of the fourth lens facing an image side.

2. The image pickup lens of claim 1, satisfying a following expression:

$$-4.00 < Pair/P < -0.80,$$

where a refractive power is represented by a reciprocal of a focal length,

P is a refractive power of a total system of the image pickup lens, and

Pair is a refractive power of an air lens formed from a surface of the second lens facing an image side and a surface of the third lens facing the object side, and is defined by a following expression:

$$Pair = \frac{1-n2}{r4} + \frac{n3-1}{r5} - \frac{(1-n2)(n3-1) \times d23}{r4 \times r5},$$

where n2 is a refractive index of the second lens for d line, n3 is a refractive index of the third lens for d line, r4 is a curvature radius of the surface of the second lens facing the image side, r5 is a curvature radius of the surface of the third lens facing the object side, and d23 is a length of an air space between the second lens and the third lens along an optical axis of the image pickup lens.

3. The image pickup lens of claim 1, satisfying a following expression:

$$-0.90<f4/f<-0.20,$$

where f4 is a focal length of the fourth lens and
f is the focal length of the total system of the image pickup lens.

4. The image pickup lens of claim 1, satisfying a following expression:

$$0.28<(r7+r8)/(r7-r8)<0.79.$$

5. The image pickup lens of claim 1,
wherein a surface of the second lens facing an image side has an aspheric shape such that a negative refractive power at a position on the surface of the second lens becomes smaller as the position moves from a center to a periphery of the surface of the second lens.

6. The image pickup lens of claim 1,
wherein a surface of the third lens facing an image side has an aspheric shape such that a positive refractive power at a position on the surface of the third lens becomes smaller as the position moves from a center to a periphery of the surface of the third lens.

7. The image pickup lens of claim 1,
wherein a surface of the fourth lens facing an image side has an aspheric shape such that a negative refractive power at a position on the surface of the fourth lens becomes smaller as the position moves from a center to a periphery of the surface of the fourth lens, and
the surface of the fourth lens facing an image side has an inclination point.

8. The image pickup lens of claim 7,
wherein the surface of the fourth lens facing the image side satisfies a following expression:

$$0.40<PH8/H<0.80,$$

where PH8 is a height of an inflection point of the surface of the fourth lens facing the image side from an optical axis, and
H is an effective radius of the surface of the fourth lens facing the image side.

9. The image pickup lens of claim 1, satisfying a following expression:

$$15<v1-v2<65,$$

where v1 is an Abbe number of the first lens, and
v2 is an Abbe number of the second lens.

10. The image pickup lens of claim 1, satisfying a following expression:

$$1.60<n2<2.10,$$

where n2 is a refractive index of the second lens for d line.

11. The image pickup lens of claim 1,
wherein each of the first to fourth lenses is formed of a plastic material.

12. The image pickup lens of claim 1,
wherein one of the first lens and the third lens is formed of a glass material, and each of the first to fourth lenses excluding the one of the first lens and the third lens is formed of a plastic material.

13. The image pickup lens of claim 1,
wherein each of the first to fourth lenses is formed of a glass material.

14. The image pickup lens of claim 1,
wherein each of the first and second lenses is formed of a glass material, and
each of the third and fourth lenses is formed of a plastic material.

15. An image pickup apparatus comprising:
a base board supporting the solid image pickup element;
a connecting terminal formed on the base board for transmitting and receiving electrical signal;
a casing formed of a shielding material, and comprising an opening where a light flux from an object side enters into; and
the image pickup lens of claim 1 housed in the casing, for receiving a light flux passing through the opening and forming the light flux onto the solid image pickup element,
wherein the casing, the image pickup lens, and the base board are assembled as one body, and
the image pickup apparatus has a height of 10 mm or less along the optical axis.

16. A mobile terminal comprising the image pickup apparatus of claim 15.

* * * * *